US010190887B2

(12) United States Patent
Nishimura

(10) Patent No.: US 10,190,887 B2
(45) Date of Patent: Jan. 29, 2019

(54) MOBILE ELECTRONIC DEVICE, INFORMATION PROVISION METHOD, INFORMATION PROVISION CODE, AND INFORMATION PROVISION SYSTEM

(71) Applicant: KYOCERA Corporation, Kyoto-shi, Kyoto (JP)

(72) Inventor: Fuminori Nishimura, Fujisawa (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/506,718

(22) PCT Filed: Aug. 13, 2015

(86) PCT No.: PCT/JP2015/072901
§ 371 (c)(1),
(2) Date: Feb. 24, 2017

(87) PCT Pub. No.: WO2016/031584
PCT Pub. Date: Mar. 3, 2016

(65) Prior Publication Data
US 2017/0248440 A1 Aug. 31, 2017

(30) Foreign Application Priority Data

Aug. 27, 2014 (JP) ................................. 2014-173133

(51) Int. Cl.
*G01C 21/36* (2006.01)
*G01C 21/34* (2006.01)
(Continued)

(52) U.S. Cl.
CPC ......... *G01C 21/3682* (2013.01); *G01C 21/26* (2013.01); *G01C 21/3423* (2013.01);
(Continued)

(58) Field of Classification Search
CPC ............ G01C 21/3682; G01C 21/3423; G01C 21/3641; G01C 21/3697
(Continued)

(56) References Cited

U.S. PATENT DOCUMENTS

| 9,234,965 B2* | 1/2016 | Venkatraman ........... G01C 5/06 |
| 2013/0103313 A1* | 4/2013 | Moore ................... G01C 21/20 701/533 |

(Continued)

FOREIGN PATENT DOCUMENTS

| JP | 2009-229204 A | 10/2009 |
| JP | 2009229204 A * | 10/2009 |

(Continued)

OTHER PUBLICATIONS

NPL english translation of JP2009229204A provided from EPO.*
International Search Report for PCT/JP2015/072901, dated Oct. 27, 2015.

*Primary Examiner* — Yazan A Soofi
(74) *Attorney, Agent, or Firm* — Hauptman Ham, LLP

(57) ABSTRACT

In an aspect, a mobile electronic device includes a storage configured to store a plurality of items of information, and a controller configured to display an item based on information in accordance with a determined movement state among the plurality of items of information. The controller may put a priority on an item based on the information in accordance with the determined movement state among the plurality of items of information to display. The controller displays information corresponding to the movement state determined in this manner on a display to present to a user.

6 Claims, 20 Drawing Sheets

(51) Int. Cl.
  *G01C 21/26* (2006.01)
  *G08G 1/123* (2006.01)
  *G06F 21/31* (2013.01)
  *H04W 4/02* (2018.01)
  *G08G 1/005* (2006.01)
  *G09B 29/10* (2006.01)
  *G08G 1/14* (2006.01)
  *G09B 29/00* (2006.01)

(52) U.S. Cl.
  CPC ..... *G01C 21/3641* (2013.01); *G01C 21/3697* (2013.01); *G06F 21/316* (2013.01); *G08G 1/123* (2013.01); *H04W 4/027* (2013.01); *G08G 1/005* (2013.01); *G08G 1/142* (2013.01); *G09B 29/007* (2013.01); *G09B 29/10* (2013.01)

(58) Field of Classification Search
  USPC .......................................................... 701/410
  See application file for complete search history.

(56) References Cited

U.S. PATENT DOCUMENTS

| | | | |
|---|---|---|---|
| 2014/0277843 A1* | 9/2014 | Langlois | H04M 1/6091 701/2 |
| 2014/0336925 A1* | 11/2014 | Akin | G01C 21/00 701/457 |
| 2015/0050923 A1* | 2/2015 | Tu | H04W 4/046 455/418 |
| 2015/0120336 A1* | 4/2015 | Grokop | B60W 40/09 705/4 |

FOREIGN PATENT DOCUMENTS

| | | |
|---|---|---|
| JP | 2010-66753 A | 3/2010 |
| JP | 2010-101777 A | 5/2010 |
| JP | 2011-117775 A | 6/2011 |

* cited by examiner

FIG.2

| POSITIONAL INFORMATION | NAME OF PLACE | MOVEMENT STATE | | | | |
|---|---|---|---|---|---|---|
| | | WALKING | RUNNING | BICYCLE | CAR | TRAIN |
| xxxxxxx | AA STATION | SURROUNDING AREA INFORMATION FOR AA STATION | TIMETABLE INFORMATION FOR AA STATION | INFORMATION ON BICYCLE PARKING LOTS NEAR AA STATION | INFORMATION ON CAR PARKING LOTS NEAR AA STATION | TRANSFER INFORMATION FOR AA STATION |
| yyyyyy | BB MALL | ADVERTISEMENT INFORMATION FOR BB MALL | FLOOR MAP INFORMATION FOR BB MALL | INFORMATION ON BICYCLE PARKING LOTS NEAR BB MALL | INFORMATION ON CAR PARKING LOTS NEAR BB MALL | - |
| ... | ... | ... | ... | ... | ... | ... |

| POSITIONAL INFORMATION | NAME OF PLACE | RELATED INFORMATION ||||||  PRIORITY ORDER |||||
|---|---|---|---|---|---|---|---|---|---|---|---|
| | | A | B | C | D | E | ... | WALK-ING | RUN-NING | BICYCLE | CAR | TRAIN |
| xxxxxx | AA STATION | SUR- ROUNDING AREA INFORMA- TION FOR AA STATION | TIMETABLE INFORMA- TION FOR AA STATION | INFORMA- TION ON BICYCLE PARKING LOTS NEAR AA STATION | INFORMA- TION ON CAR PARKING LOTS NEAR AA STATION | TRANSFER INFORMA- TION FOR AA STATION | ... | A, B | B, A | C, B, A | D, B, A | E, A, B |
| yyyyyy | BB MALL | ADVER- TISEMENT INFORMA- TION FOR BB MALL | FLOOR MAP INFORMA- TION FOR BB MALL | INFORMA- TION ON BICYCLE PARKING LOTS NEAR BB MALL | INFORMA- TION ON CAR PARKING LOTS NEAR BB MALL | - | ... | A, B | B, A | C, B, A | D, B, A | - |
| ⋮ | ⋮ | ⋮ | ⋮ | ⋮ | ⋮ | ⋮ | ⋮ | ⋮ | ⋮ | ⋮ | ⋮ | ⋮ |

| POSITIONAL INFORMATION | NAME OF PLACE | TIME PERIOD | MOVEMENT STATE ||||||
|---|---|---|---|---|---|---|---|
| | | | WALKING | RUNNING | BICYCLE | CAR | TRAIN |
| xxxxxxx | AA STATION | 0:00 TO 8:00 | SURROUNDING AREA INFORMATION FOR AA STATION | | | INFORMATION ON CAR PARKING LOTS NEAR AA STATION (NIGHTTIME FEE) | |
| | | 8:00 TO 12:00 | | TIMETABLE INFORMATION FOR AA STATION (MORNING) | | | TRANSFER INFORMATION FOR AA STATION |
| | | 12:00 TO 14:00 | LUNCH INFORMATION NEAR AA STATION | TIMETABLE INFORMATION FOR AA STATION (AFTERNOON) | INFORMATION ON BICYCLE PARKING LOTS NEAR AA STATION | INFORMATION ON CAR PARKING LOTS NEAR AA STATION (REGULAR FEE) | |
| | | 14:00 TO 18:00 | | | | | |
| | | 18:00 TO 22:00 | SURROUNDING AREA INFORMATION FOR AA STATION | TIMETABLE INFORMATION FOR AA STATION (EVENING) | | INFORMATION ON CAR PARKING LOTS NEAR AA STATION (NIGHTTIME FEE) | |
| | | 22:00 TO 24:00 | | | | | |
| | BB MALL | 00:00 TO 9:00 | ADVERTISEMENT INFORMATION FOR BB MALL | ADVERTISEMENT INFORMATION FOR BB MALL | | | - |
| | | 9:00 TO 12:00 | | | INFORMATION ON BICYCLE PARKING LOTS NEAR BB MALL | INFORMATION ON CAR PARKING LOTS NEAR BB MALL | - |
| | | 12:00 TO 16:00 | LUNCH INFORMATION NEAR BB MALL | LUNCH INFORMATION NEAR BB MALL | | | - |
| | | 16:00 TO 22:00 | TIME SALE INFORMATION FOR BB MALL | TIME SALE INFORMATION FOR BB MALL | | | - |
| | | 22:00 TO 24:00 | | | | | - |
| ... | | ... | ... | ... | ... | ... | ... |

23c

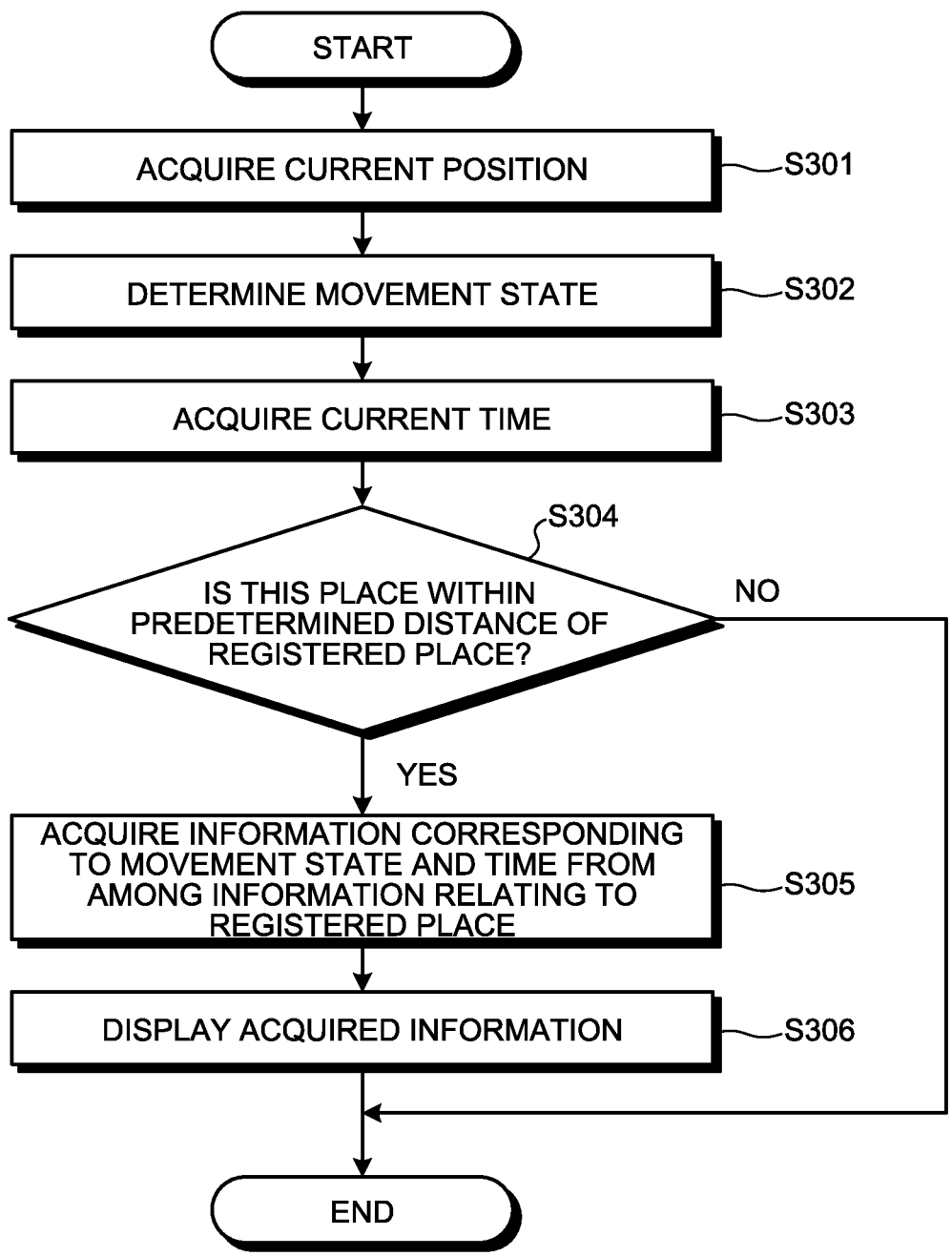

| MOVEMENT STATE | START | | | END | | |
|---|---|---|---|---|---|---|
| | DATE | TIME | NAME OF PLACE | DATE | TIME | NAME OF PLACE |
| WALKING | 2014/9/2 | 8:10 | HOME | 2014/9/2 | 8:23 | AA STATION |
| TRAIN | 2014/9/2 | 8:23 | AA STATION | 2014/9/2 | 8:41 | CC STATION |
| WALKING | 2014/9/2 | 8:41 | CC STATION | 2014/9/2 | 8:53 | DD BUILDING |
| REST | 2014/9/2 | 8:53 | DD BUILDING | 2014/9/2 | 17:01 | DD BUILDING |
| WALKING | 2014/9/2 | 17:01 | DD BUILDING | 2014/9/2 | 17:16 | CC STATION |
| TRAIN | 2014/9/2 | 17:16 | CC STATION | 2014/9/2 | 17:34 | AA STATION |
| WALKING | 2014/9/2 | 17:34 | AA STATION | 2014/9/2 | 18:07 | BB MALL |
| REST | 2014/9/2 | 18:07 | BB MALL | 2014/9/2 | 18:57 | BB MALL |
| WALKING | 2014/9/2 | 18:57 | BB MALL | 2014/9/2 | 19:38 | HOME |
| ⋮ | ⋮ | ⋮ | | ⋮ | ⋮ | ⋮ |

FIG.16

| NAME OF PLACE | START | | END | |
|---|---|---|---|---|
| | DATE | TIME | DATE | TIME |
| DD BUILDING | 2014/9/2 | 8:48 | 2014/9/2 | 17:05 |
| BB MALL | 2014/9/2 | 17:54 | 2014/9/2 | 19:11 |
| ... | ... | ... | ... | ... |

25

MOBILE ELECTRONIC DEVICE, INFORMATION PROVISION METHOD, INFORMATION PROVISION CODE, AND INFORMATION PROVISION SYSTEM

RELATED APPLICATION

The present application is a National Phase entry of International Application No. PCT/JP2015/072901, filed Aug. 13, 2015, which claims priority of Japanese Application No. 2014-173133, filed Aug. 27, 2014.

FIELD

The present application relates to a mobile electronic device, an information provision method, an information provision code, and an information provision system.

BACKGROUND

A mobile navigation apparatus is provided with a current position detection unit that detects a current position, a guide information output unit that outputs guide information, a movement classification recognition unit that recognizes a movement state, a control unit that controls guidance processing by the guide information output unit. The control unit changes map information used to guide depending on a movement classification recognized by the movement classification recognition unit.

SUMMARY

In one aspect, a mobile electronic device includes a storage configured to store a plurality of items of information, and a controller configured to display an item based on information in accordance with a determined movement state among the plurality of items of information.

In one aspect, a mobile electronic device includes a storage configured to store a plurality of items of information, and a controller configured to put a priority on an item based on information in accordance with a determined movement state among the plurality of items of information to display.

In one aspect, an information provision method includes steps of determining a movement state, and displaying an item based on information in accordance with the determined movement state among a plurality of items of information.

In one aspect, a non-transitory computer readable recording medium storing thereon an information provision code for causing, when executed by an electronic device, the electronic device to execute steps of determining a movement state, and displaying an item based on information in accordance with the determined movement state among a plurality of items of information.

In one aspect, an information provision system includes a server and a mobile electronic device. The server stores a plurality of items of information. The mobile electronic device displays an item based on information in accordance with a determined movement state of the mobile electronic device among the plurality of items of information.

BRIEF DESCRIPTION OF DRAWINGS

FIG. 2 is a diagram illustrating an exemplary condition table.

FIG. 7 is a diagram illustrating an exemplary condition table.

FIG. 12 is a diagram illustrating an exemplary condition table.

FIG. 13 is a flowchart illustrating an exemplary information provision action by the mobile electronic device.

FIG. 16 is a diagram illustrating a specific example of a stay history table.

DETAILED DESCRIPTION

Figure 1:
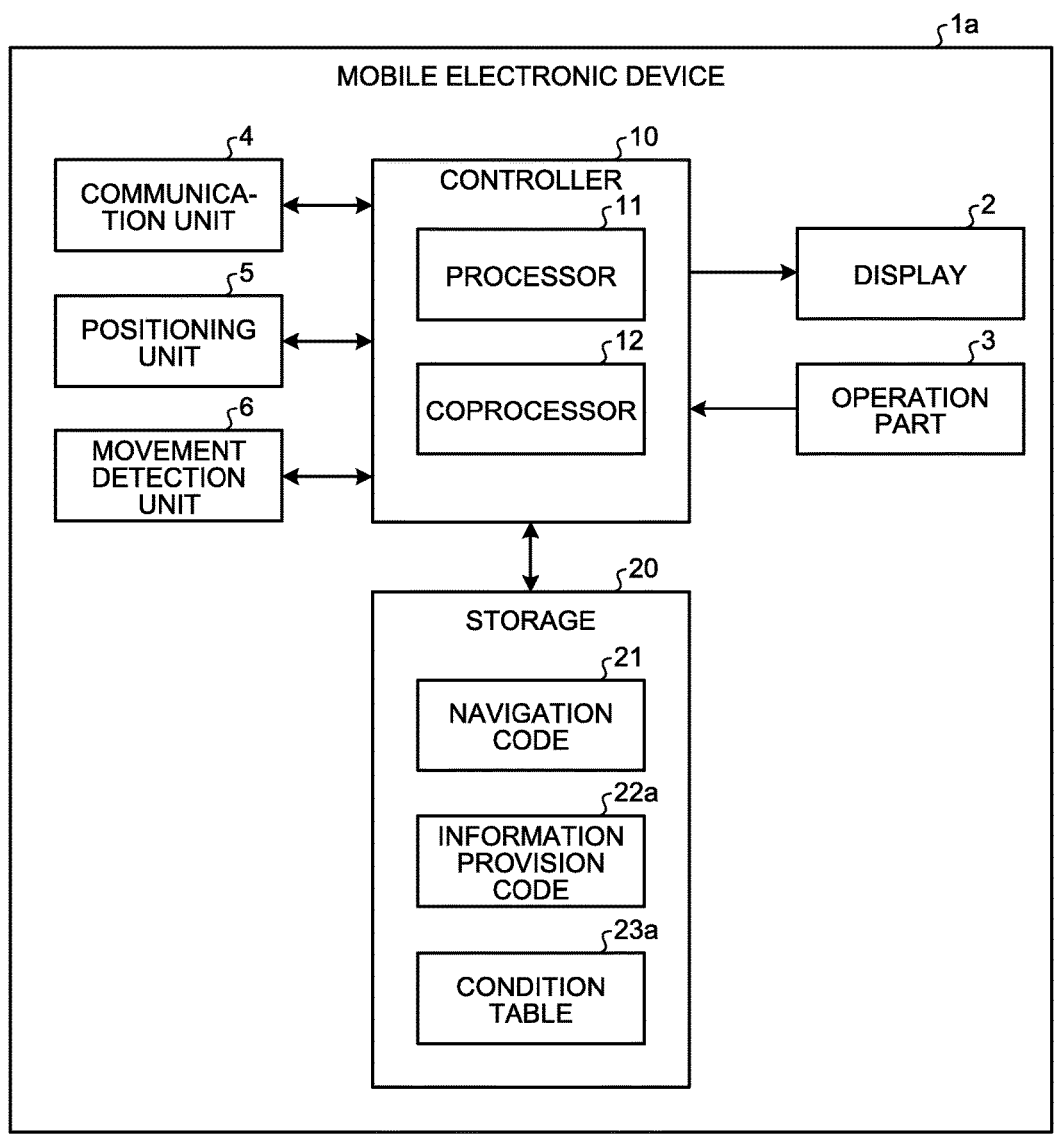
FIG. 1 is a block diagram of a mobile electronic device according to an exemplary embodiment.

Examples of a mobile electronic device to be described below include, but are not limited to, a smartphone, a mobile phone, a tablet, a mobile personal computer, a digital camera, a media player, an electronic book reader, a navigator, a game console, etc. A mobile electronic device such as a route guide map display apparatus may sometimes display unsuitable information for some movement states. For example, information on a car parking lot is displayed while walking in one case and a train timetable is displayed while riding on a car in another case.

In the following description, a portion similar to a portion that has been already described will be given a reference numeral similar to that of the portion that has been already described. Duplicated description will not be repeated in some cases.

A configuration of a mobile electronic device 1a according to an exemplary embodiment will be described with reference to FIG. 1. FIG. 1 is a block diagram of the mobile electronic device 1a. As illustrated in FIG. 1, the mobile electronic device 1a includes a display 2, an operation part 3, a communication unit 4, a positioning unit 5, a movement detection unit 6, a controller 10, and a storage 20.

The display 2 includes a display device such as a liquid crystal display, an organic electro-luminescence display, or an inorganic electro-luminescence display. The display 2 uses the display device to display a screen including a text, an image, a symbol, a figure, or the like.

The operation part 3 accepts operation by a user.

Examples of the operation part 3 include, but are not limited to, a button, a keyboard, a dial, a lever, a touch screen (touch sensor), etc. The operation part 3 may accept operation by a noncontact approach using a sound, light, or the like. The operation part 3 may support a plurality of operation approaches.

All or part of the operation part 3 may be integrated into the display 2. For example, a touch screen that detects contact may be disposed on a surface of the display 2 so that a gesture made by the user using his/her finger or the like on the display 2 is detected by the mobile electronic device 1a via the touch screen.

The communication unit 4 enables wireless data communication. The communication unit 4 supports wireless communication for relatively wide area provided by a communication company. Examples of the wireless communication for relatively wide area provided by a communication company include, but are not limited to, so-called 3G and 4G, etc. For example, the communication unit 4 communicates with another communication apparatus via a wireless base station. The communication unit 4 may support wireless communication having a relatively small communication range such as WiFi (registered trademark) or Bluetooth (registered trademark). The communication unit 4 may support sound communication.

The positioning unit 5 measures a current position of the mobile electronic device 1a. The positioning unit 5 uses a satellite positioning system such as GPS or GLONASS to measure the current position. The positioning unit 5 may measure the current position through another approach instead of or in addition to the satellite positioning system. For example, the positioning unit 5 may measure the current position on the basis of a radio wave received by the communication unit 4 and a wireless base station transmitting that radio wave. The positioning unit 5 may use various sensors including an acceleration sensor, a geomagnetic sensor, a gyroscope, and a direction sensor as auxiliary means to measure the current position.

The movement detection unit 6 detects a movement of the mobile electronic device 1a in a three-dimensional space. Examples of the movement detected by the movement detection unit 6 include a change in a position of the mobile electronic device 1a and a change in an attitude of the mobile electronic device 1a. The movement detection unit 6 is provided with an acceleration sensor to detect the movement of the mobile electronic device 1a. The movement detection unit 6 may be further provided with another sensor such as a gyroscope, a geomagnetic sensor, and a direction sensor to detect the movement of the mobile electronic device 1a.

When using the movement detection unit 6, the mobile electronic device 1a can acquire, for example, patterns of a frequency, an amplitude, and so on of vibration of the mobile electronic device 1a occurring due to the movement. Typically, the mobile electronic device moves while being carried by a user's hand, worn by a user, within a bag or the like carried by a user, or on a conveyance on which a user is riding. As described above, a "movement state of the mobile electronic device" matches a "movement state of the user" in many cases. For this reason, the "movement state of the mobile electronic device" will be sometimes mentioned as the "movement state of the user" in the following description.

The controller 10 controls the entire mobile electronic device 1a. The controller 10 includes a processor 11 and a coprocessor 12. The processor 11 and the coprocessor 12 are computational processing apparatuses. Examples of the computational processing apparatuses include, but are not limited to, a central processing unit (CPU), a system-on-a-chip (SoC), a micro control unit (MCU), a field-programmable gate array (FPGA), etc.

The processor 11 executes various types of codes stored in the storage 20 to realize various types of functions of the mobile electronic device 1a. Specifically, the processor 11 carries out various types of control by executing instructions included in the code while referencing data acquired from respective units and the display 2 of the mobile electronic device 1a and a result of computational processing.

The coprocessor 12 works with lower electric power consumption than that of the processor 11. The coprocessor 12 is allowed to work as usual even while the processor 11 stops or slows down the processing speed thereof in order to reduce the electric power consumption. The coprocessor 12 having a characteristic suitable for working constantly can be used to, for example, acquire and analyze detection values from various sensors and carry out processing in accordance with a result of the analysis.

The storage 20 stores a code and data. The storage 20 is also used as a working area temporarily storing a processing result of the controller 10. The storage 20 may include any non-transitory storage medium such as a semiconductor storage medium or a magnetic storage medium. The storage 20 may include a plurality of types of storage media. The storage 20 may include a combination of a transportable non-transitory storage medium such as a memory card, an optical disc, or a magneto-optical disk and a reading apparatus for the storage medium. The storage 20 may include a storage device used as a temporary storage area such as a random access memory (RAM).

The storage 20 stores, for example, a navigation code 21, an information provision code 22a, and a condition table 23a. The navigation code 21 provides a function to display a map on the display 2 and lead the user to a destination. The information provision code 22a provides a function to determine the movement state of the user and present information corresponding to the determined movement state to the user. The information provision code 22a works in coordination with the navigation code 21 to provide information to the user. The condition table 23a may be used to determine information to be presented to the user through the function provided by the information provision code 22a.

The controller 10 may realize a function to present information corresponding to the movement state of the user to the user through the execution of the information provision code 22a. According to the function provided by the information provision code 22a, the controller 10 determines the movement state of the mobile electronic device 1a on the basis of acceleration detected by the acceleration sensor included in the movement detection unit 6. For example, acceleration in an X axis direction, acceleration in a Y axis direction, acceleration in a Z axis direction, and a vector value obtained by integrating respective items of the acceleration are transmitted to the controller 10 as a detection result from the acceleration sensor. The controller 10 logs an integrated vector value obtained by integrating the respective items of the acceleration. The controller 10 determines the movement state of the user continuously by analyzing the logged data at a predetermined time interval. It is preferable to set the predetermined time interval shorter from the viewpoint of monitoring the movement state of the user and, for example, the predetermined time interval may be set to one second or less.

In an embodiment, "rest", "walking", "running", "bicycle", "car", and "train" are determined as the movement state of the user. "Rest" represents a state where the user is substantially at rest or a state where the mobile electronic device 1a is put on a place to be fixed without moving. "Walking" represents a state where the user is walking. "Running" represents a state where the user is running. "Bicycle" represents a state where the user is riding on a bicycle. "Car" represents a state where the user is riding on a car. "Train" represents a state where the user is riding on a train. The movement states to be determined are not limited thereto and another movement state may be determined, for example, a state where the user is riding on a bus, a state where the user is riding on a motorcycle, and a state where the user is riding on a plane.

The controller 10 uses an acceleration pattern prepared in advance to determine the movement state. The acceleration pattern includes a pattern of the acceleration characteristically detected by the acceleration sensor as a feature while the user is in a certain movement state. The acceleration pattern may be prepared by, for example, acquiring a detection value from the acceleration sensor in advance while a tester is actually in a certain movement state. One or the plurality of acceleration patterns may be prepared for each of the movement states.

The controller 10 compares data obtained by logging the integrated vector value with the acceleration pattern to determine the movement state of the user. The controller 10 may further utilize the detection value from another sensor such as a geomagnetic sensor, a gyroscope, and a direction sensor to determine the movement state.

The controller 10 may determine that the user is in a state of rest when the acceleration detected by the acceleration sensor is less than a predetermined value. The controller 10 may determine that the user is in a state of rest when the data obtained by logging the integrated vector value does not match any of the acceleration patterns.

The controller 10 displays information corresponding to the movement state determined in this manner on the display 2 to present to the user. Therefore, the mobile electronic device 1a can provide more appropriate information to the user in accordance with the movement state of the user.

FIG. 2 is a diagram illustrating the exemplary condition table 23a. In the condition table 23a, information relating to a place corresponding to positional information is classified by the movement state while being associated with the positional information. The positional information is information for locating a position of a place and examples thereof include, but are not limited to, a combination of latitude and longitude, an address, etc. The information relating to a place may be real information, or alternatively, may be a reference or a link to information stored in another storage place.

In the condition table 23a, information relating to "AA station" of which the position is located by positional information of "xxxxxxx" is classified into five movement states while being associated with this place. "Surrounding area information for AA station", "timetable information for AA station", "information on bicycle parking lots near AA station", "information on car parking lots near AA station", and "transfer information for AA station" are exemplified as the information relating to "AA station" in the condition table 23a.

"Surrounding area information for AA station" is information regarding stores and amusement facilities near the AA station. On the basis of an assumption that a user who walks to a station has a strong possibility of having a free time for strolling near the station, "surrounding area information for AA station" is classified into the movement state of "walking" in the condition table 23a.

"Timetable information for AA station" is information regarding a train timetable at the AA station. On the basis of an assumption that a user who runs to a station has a strong possibility of trying to take a train quickly, "timetable information for AA station" is classified into the movement state of "running" in the condition table 23a.

"Information on bicycle parking lots near AA station" is information regarding bicycle parking lots near the AA station. On the basis of an assumption that a user who comes to a station by bicycle has a strong possibility of parking the bicycle first at a bicycle parking lot, "information on bicycle parking lots near AA station" is classified into the movement state of "bicycle" in the condition table 23a.

"Information on car parking lots near AA station" is information regarding car parking lots near the AA station. On the basis of an assumption that a user who drives to a station has a strong possibility of parking the car first at a car parking lot, "information on car parking lots near AA station" is classified into the movement state of "car" in the condition table 23a.

"Transfer information for AA station" is information regarding transfer at the AA station. On the basis of an assumption that a user who has left a train at a station where an express train stops or a station where a plurality of train routes connect with one another has a strong possibility of transferring to another train, "transfer information for AA station" is classified into the movement state of "train" in the condition table 23a. When a place of which the position is located by the positional information is a station without any transfer options, for example, transfer information for a bus is also acceptable as the information classified into the movement state of "train" when stored.

The controller 10 classifies the information relating to a place in the condition table 23a on the basis of the degree of demand assumed for a user who has come to that place with the individual movement state, thereby being able to provide more appropriate information to the user in accordance with the movement state of the user.

The condition table 23a may store information regarding places used by many people thoroughly, or alternatively, may solely store information regarding a place selected by the user in advance. As for a movement state having no connection with the positional information or little connection therewith, there is a case where the condition table 23a stores no information relating to a place corresponding to the positional information. For example, because there is little connection between positional information of "yyyyyyy" and the movement state "train", the information relating to a place corresponding to the positional information is not stored in a classification of "train" for "yyyyyyy" in the condition table 23a.

Figure 3:
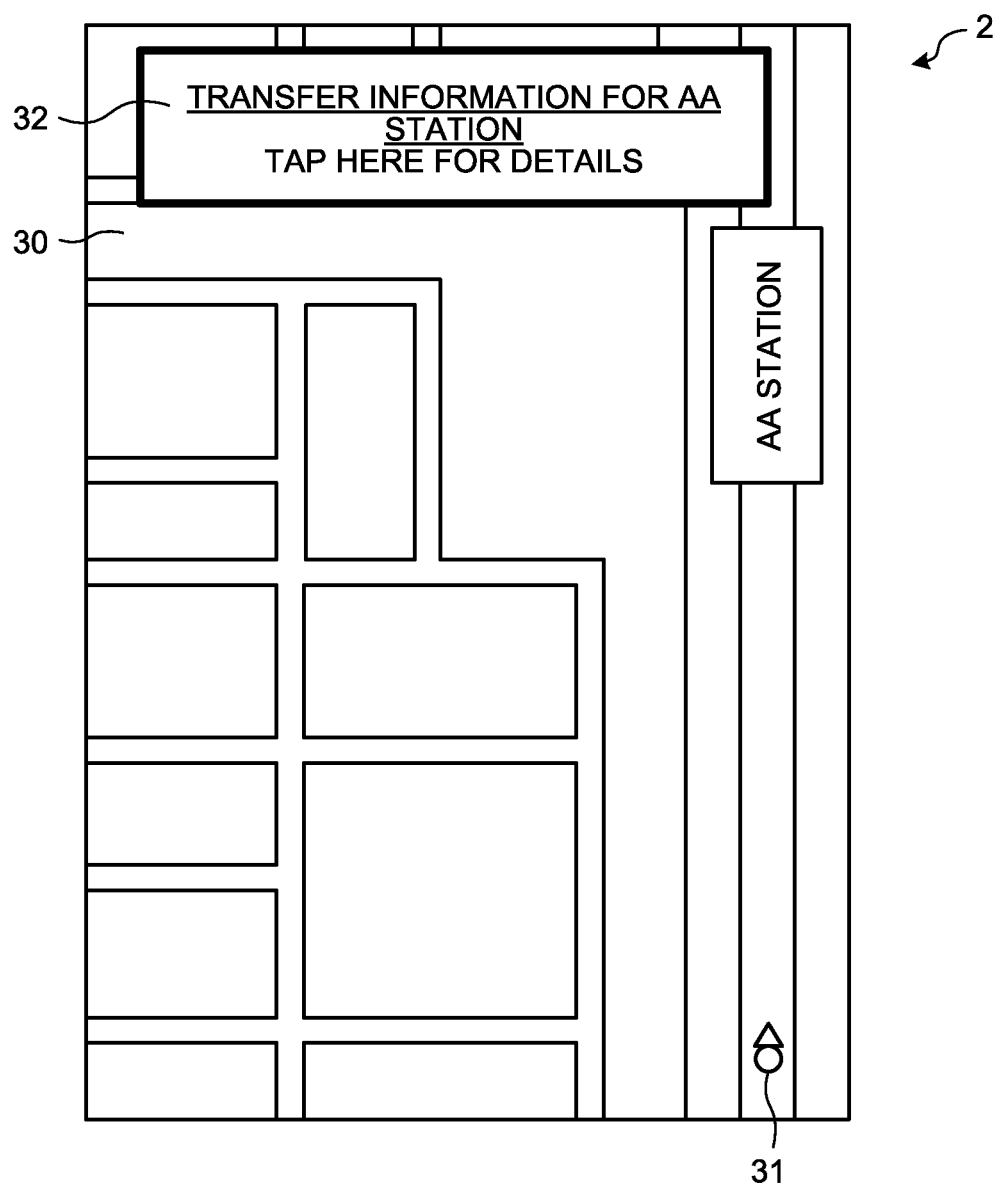
FIG. 3 is a diagram illustrating a specific example of information presentation in a case where a movement state is "train".

FIG. 3 is a diagram illustrating a specific example of information presentation in a case where the movement state is "train".

In FIG. 3, the display 2 displays a map 30 for leading the user through the function provided by the navigation code 21. The display 2 additionally displays a mark 31 indicating the current position of the mobile electronic device 1a.

In a scene illustrated in FIG. 3, the current position of the mobile electronic device 1a is present within a range of a predetermined distance of "AA station". As described above, once a distance between the mobile electronic device 1a and a place registered in advance becomes shorter than the predetermined distance, the mobile electronic device 1a determines the movement state by referencing the movement state determined at the timing when the aforementioned distance became shorter than that predetermined distance. The mobile electronic device 1a acquires information corresponding to the place registered in advance and the determined movement state from the condition table 23a. Thereafter, the mobile electronic device 1a displays the acquired information on the display 2.

In the scene illustrated in FIG. 3, a place approached closer than the predetermined distance is "AA station" and the movement state is "train". Accordingly, the mobile electronic device 1a acquires "transfer information for AA station" from the condition table 23a to display on the display 2 as a pop-up 32. By tapping the pop-up 32, the user can display details of "transfer information for AA station" on the display 2.

Figure 4:
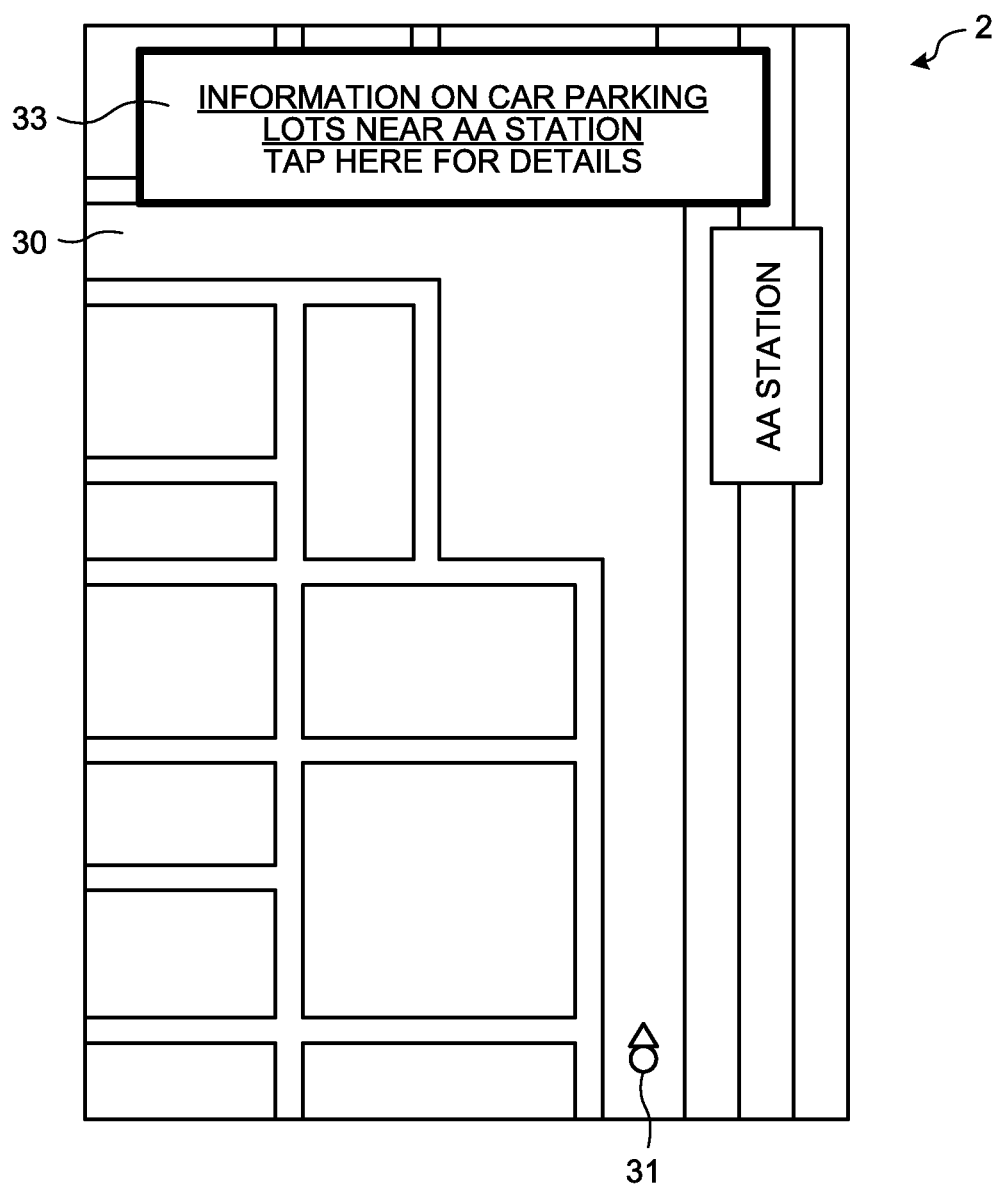
FIG. 4 is a diagram illustrating a specific example of the information presentation in a case where the movement state is "car".

FIG. 4 is a diagram illustrating a specific example of the information presentation in a case where the movement state is "car". Also in a scene illustrated in FIG. 4, the current position of the mobile electronic device 1a is present within the range of the predetermined distance of "AA station". In this example, a place approached closer than the predetermined distance is "AA station" and the movement state is "car". Accordingly, the mobile electronic device 1a acquires "information on car parking lots near AA station" from the condition table 23a to display on the display 2 as a pop-up 33. By tapping the pop-up 33, the user can display details of "information on car parking lots near AA station" on the display 2.

Both of FIGS. 3 and 4 illustrate a scene where the current position of the mobile electronic device 1a enters the range of the predetermined distance of "AA station". However, because the determined movement states differ from each other, different information from each other is displayed on the display 2 as information relating to "AA station".

FIGS. 3 and 4 have described an example where the information corresponding to the movement state is displayed in two levels, namely, an overview and details. However, a way of displaying the information corresponding to the movement state is not limited thereto. Details of the information corresponding to the movement state may be displayed from the start without displaying the overview as a pop-up.

The information to be displayed is not necessarily required to be the actual information corresponding to the movement state and only required to be based on the information corresponding to the movement state. For example, information suggesting the contents of the information corresponding to the movement state may be employed, including an icon or an abbreviation.

Figure 5:
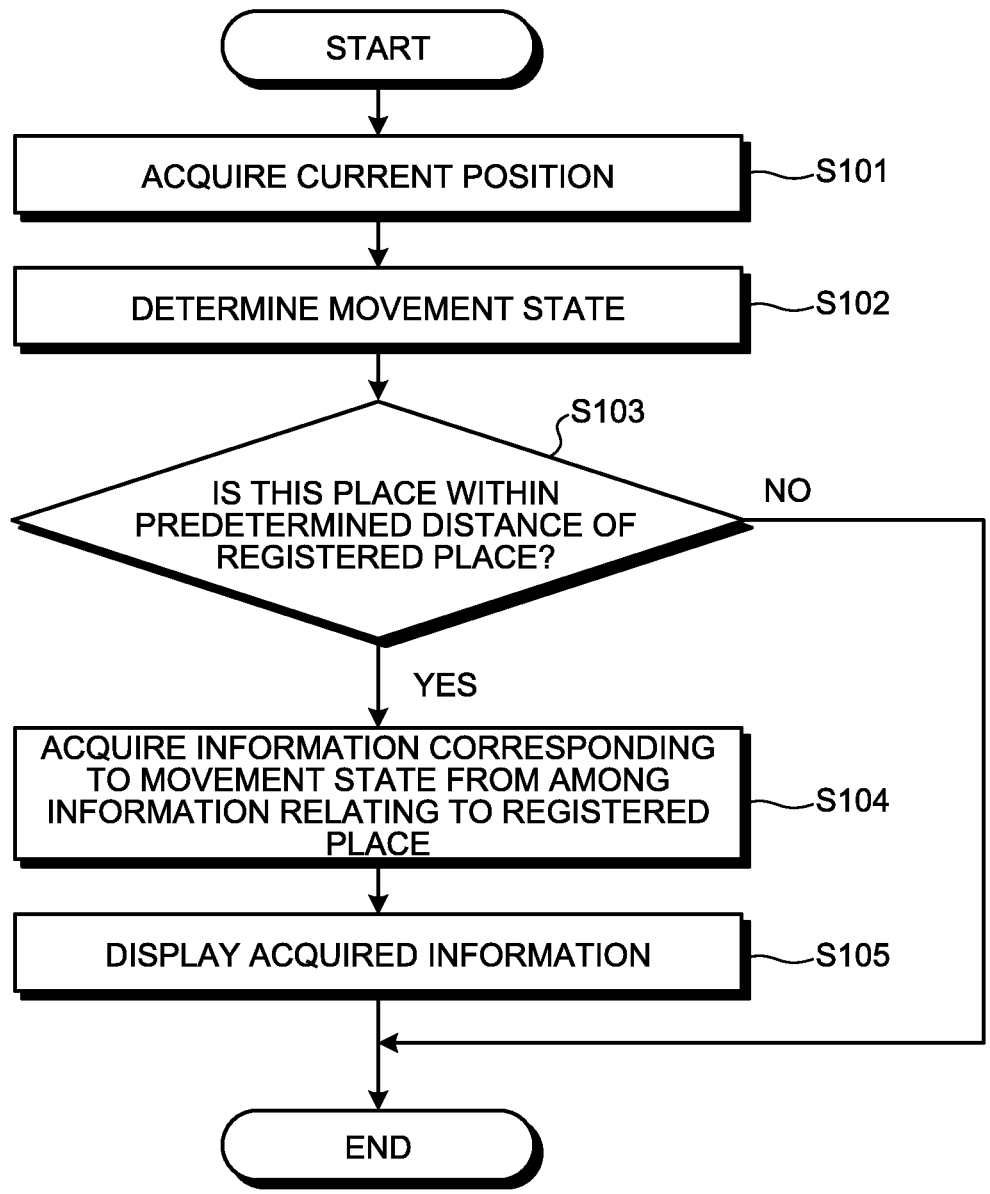
FIG. 5 is a flowchart illustrating an exemplary information provision action by the mobile electronic device.

FIG. 5 is a flowchart illustrating an exemplary information provision action by the mobile electronic device 1a. The action illustrated in FIG. 5 is realized when the controller 10 executes the information provision code 22a. The action illustrated in FIG. 5 is repeatedly carried out during a period while an information provision function is enabled. The "period while an information provision function is enabled" means, for example, a period while the navigation code 21 is executed.

As illustrated in FIG. 5, the controller 10 acquires the current position at step S101 by using the positioning unit 5. Additionally, the controller 10 determines the movement state at step S102. The controller 10 may use the coprocessor 12 to continuously carry out determination processing for the movement state. In this case, at step S102, the controller 10 acquires a latest determination result of the determination processing for the movement state carried out continuously.

Subsequently, at step S103, the controller 10 determines whether the mobile electronic device 1a has entered an area within the predetermined distance of a certain place registered in the condition table 23a. The controller 10 may compare the acquired current position with the individual positional information of a place registered in the condition table 23a to determine whether the area within the predetermined distance of a certain place registered in the condition table 23a has been entered. The predetermined distance may be set for each of the movement states.

When the mobile electronic device 1a has entered the area within the predetermined distance of the certain place registered in the condition table 23a (step S103: Yes), the controller 10 proceeds to step S104. At step S104, among information relating to the place of which the area within the predetermined distance has been entered, the controller 10 reads information corresponding to the movement state determined at step S102 from the condition table 23a. Thereafter, the controller 10 displays the read information on the display 2 at step S105. When the mobile electronic device 1a has not entered the area within the predetermined distance of the certain place registered in the condition table 23a (step S103: No), step S104 and step S105 are not carried out.

Figure 6:
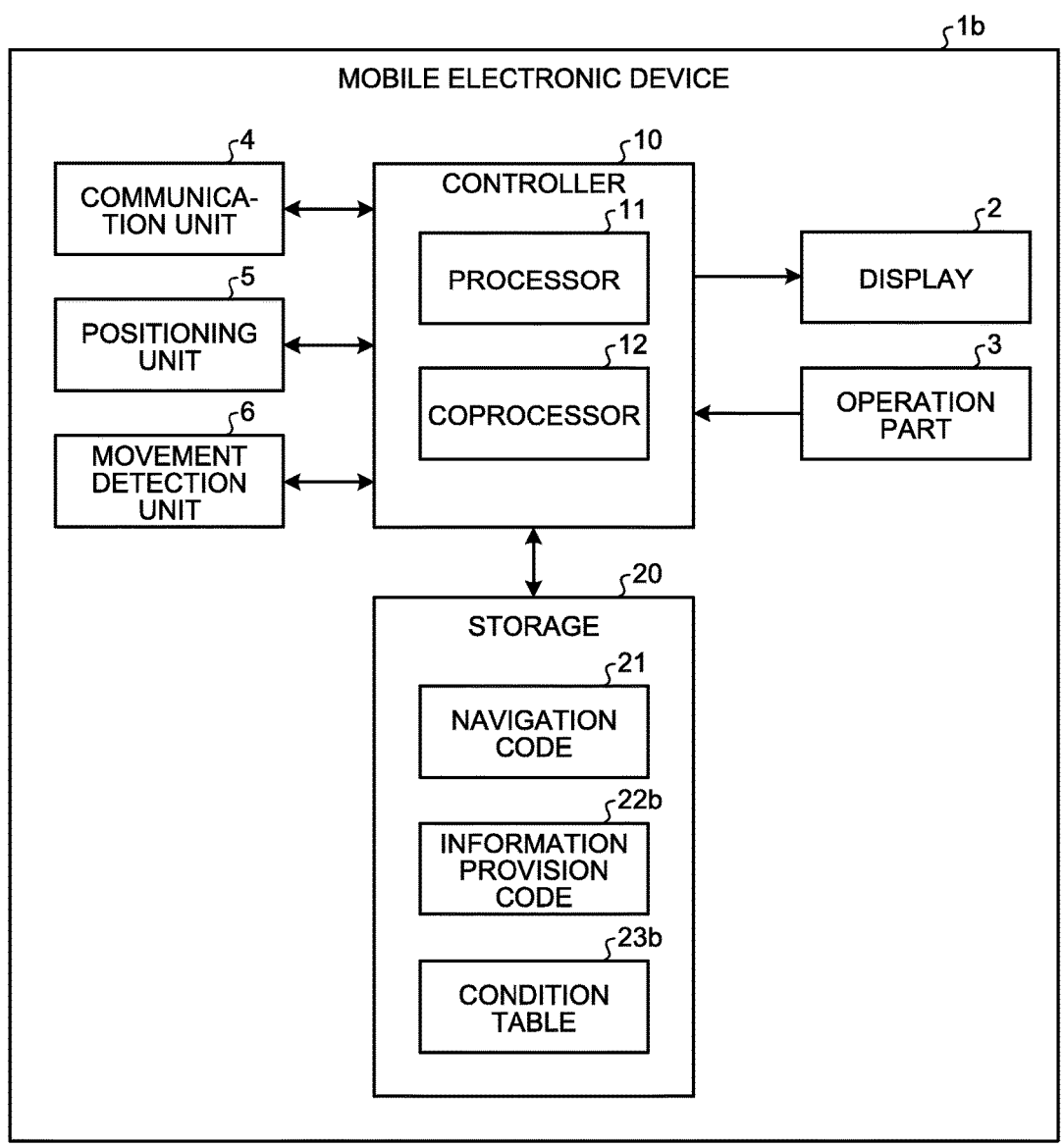
FIG. 6 is a block diagram of a mobile electronic device according to an exemplary embodiment.

FIG. 6 is a block diagram of a mobile electronic device 1b according to an exemplary embodiment. In the mobile electronic device 1b, the storage 20 stores an information provision code 22b instead of the information provision code 22a and stores a condition table 23b instead of the condition table 23a. The other configurations of the mobile electronic device 1b can be similar to those of the mobile electronic device 1a.

The information provision code 22b provides a function to determine the movement state of the user and put a priority on the information corresponding to the determined movement state when displaying for the user. The phrase "putting a priority when displaying" means displaying the information corresponding to the determined movement state in a most easy form for the user to recognize, while displaying a plurality of items of information including information corresponding to a movement state different from the determined movement state. The easiness to recognize information can be controlled through the adjustment of at least one of, for example, the order to display information, the size of an area where information is displayed, and a color used to display information.

FIG. 7 is a diagram illustrating the exemplary condition table 23b. The condition table 23b includes information relating to a place corresponding to the positional information to associate with the positional information. Additionally, each item of the information relating to a place is given priority orders in the condition table 23b with respect to the respective movement states.

"Surrounding area information for AA station", "timetable information for AA station", "information on bicycle parking lots near AA station", "information on car parking lots near AA station", and "transfer information for AA station" are stored in the condition table 23b as information relating to "AA station" of which the position is located by positional information of "xxxxxxx".

A reference character of "A" is given to "surrounding area information for AA station". A reference character of "B" is given to "timetable information for AA station". A reference character of "C" is given to "information on bicycle parking lots near AA station". A reference character of "D" is given to "information on car parking lots near AA station". A reference character of "E" is given to "transfer information for AA station".

The priority orders are given to "A" and "B" in this order regarding the movement state of "walking". In other words, regarding the movement state of "walking", a highest priority order is given to "surrounding area information for AA station" which has been associated with the movement state of "walking" in the condition table 23a. As a result, the mobile electronic device 1b puts a priority on "surrounding area information for AA station" to display in a case where the movement state is "walking".

The priority orders are given to "B" and "A" in this order regarding the movement state of "running". In other words, regarding the movement state of "running", a highest priority order is given to "timetable information for AA station" which has been associated with the movement state of "running" in the condition table 23b. As a result, the mobile electronic device 1b puts a priority on "timetable information for AA station" to display in a case where the movement state is "running".

The priority orders are given to "C", "B", and "A" in this order regarding the movement state of "bicycle". In other words, regarding the movement state of "bicycle", a highest priority order is given to "information on bicycle parking lots near AA station" which has been associated with the movement state of "bicycle" in the condition table 23b. As a result, the mobile electronic device 1b puts a priority on "information on bicycle parking lots near AA station" to display in a case where the movement state is "bicycle".

The priority orders are given to "D", "B", and "A" in this order regarding the movement state of "car". In other words, regarding the movement state of "car", a highest priority order is given to "information on car parking lots near AA station" which has been associated with the movement state of "car" in the condition table 23b. As a result, the mobile electronic device 1b puts a priority on "information on car parking lots near AA station" to display in a case where the movement state is "car".

The priority orders are given to "E", "A", and "B" in this order regarding the movement state of "train". In other words, regarding the movement state of "train", a highest priority order is given to "transfer information for AA station" which has been associated with the movement state of "train" in the condition table 23b. As a result, the mobile electronic device 1b puts a priority on "transfer information for AA station" to display in a case where the movement state is "train".

As described above, the condition table 23b may be configured in such a manner as to put a priority on the information corresponding to the movement state, namely, information assumed to be most useful while the user is in that movement state to display. The configuration of the condition table 23b is not limited to the example illustrated in FIG. 7 and only required to be configured in such a manner as to put a priority on the information corresponding to the movement state to display.

Figure 8:
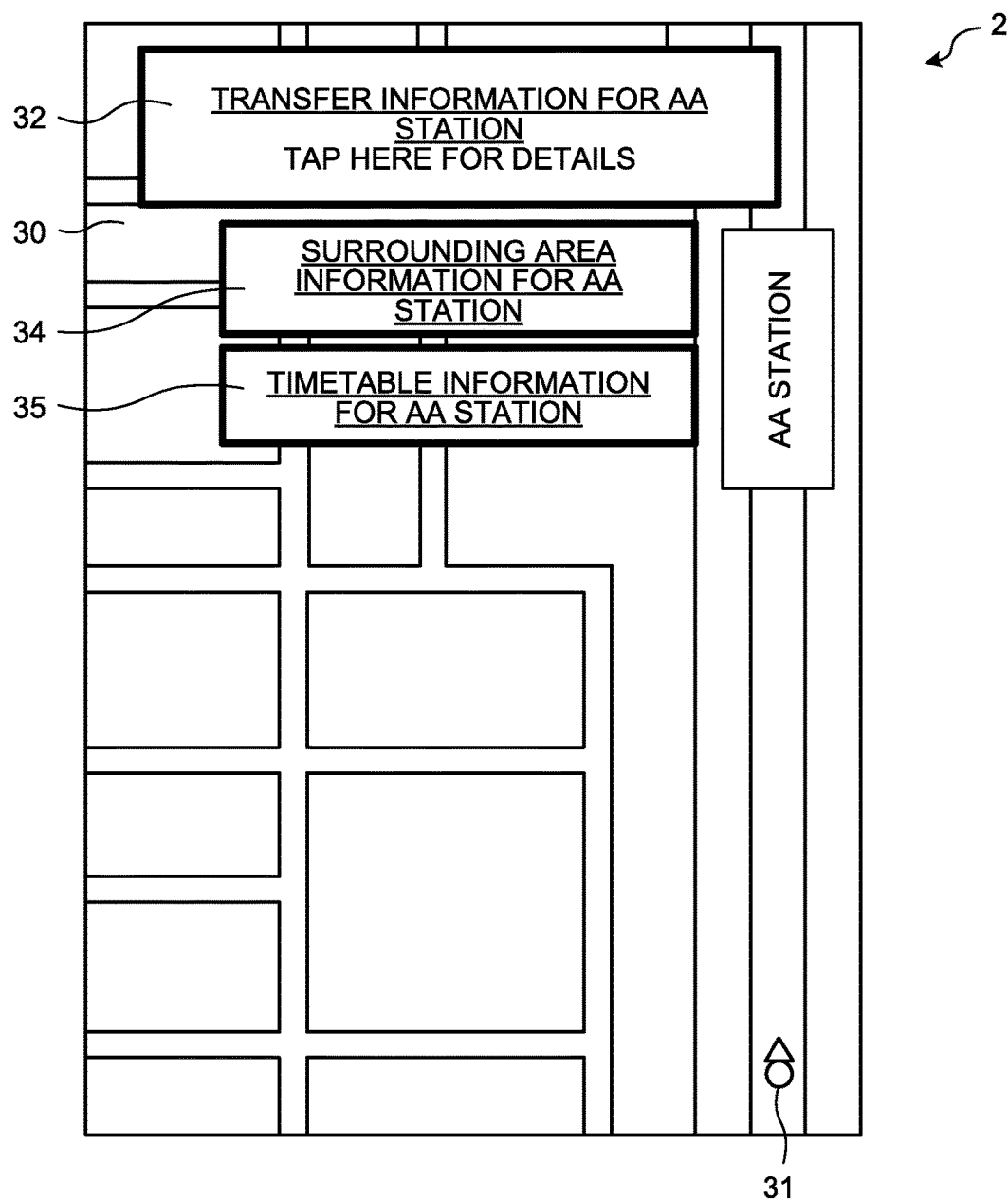
FIG. 8 is a diagram illustrating a specific example of the information presentation in a case where the movement state is "train".

FIG. 8 is a diagram illustrating a specific example of the information presentation in a case where the movement state is "train".

In FIG. 8, the display 2 displays the map 30 for leading the user through the function provided by the navigation code 21. The display 2 additionally displays the mark 31 indicating the current position of the mobile electronic device 1b.

In a scene illustrated in FIG. 8, the current position of the mobile electronic device 1b is present within the range of the predetermined distance of "AA station". As described above, once a distance between the mobile electronic device 1b and a place registered in advance becomes shorter than the predetermined distance, the mobile electronic device 1b determines the movement state by referencing the movement state determined at the timing when the aforementioned distance became shorter than that predetermined distance. The mobile electronic device 1b acquires, from the condition table 23b, information corresponding to the place registered in advance and the priority orders of these items of the information for the determined movement state. Thereafter, the mobile electronic device 1b displays the information corresponding to the place registered in advance on the display 2 on the basis of the priority orders.

In the example illustrated in FIG. 8, a place approached by the mobile electronic device 1b closer than the predetermined distance is "AA station" and the movement state of the mobile electronic device 1b is "train".

Accordingly, the mobile electronic device 1b acquires information relating to "AA station" from the condition table 23b and displays these items of the information on the basis of the priority orders, namely, in the order of "E", "A", and "B". In the example illustrated in FIG. 8, the mobile electronic device 1b displays, as the pop-up 32, "transfer information for AA station" corresponding to the reference character of "E" having the highest priority order at an uppermost section in a largest size. Additionally, the mobile electronic device 1b displays, as pop-ups 34 and 35, "surrounding area information for AA station" and "timetable information for AA station" corresponding to the reference characters of "A" and "B" having second highest priority orders, respectively, below the pop-up 32 in a smaller size than the size of the pop-up 32.

Figure 9:
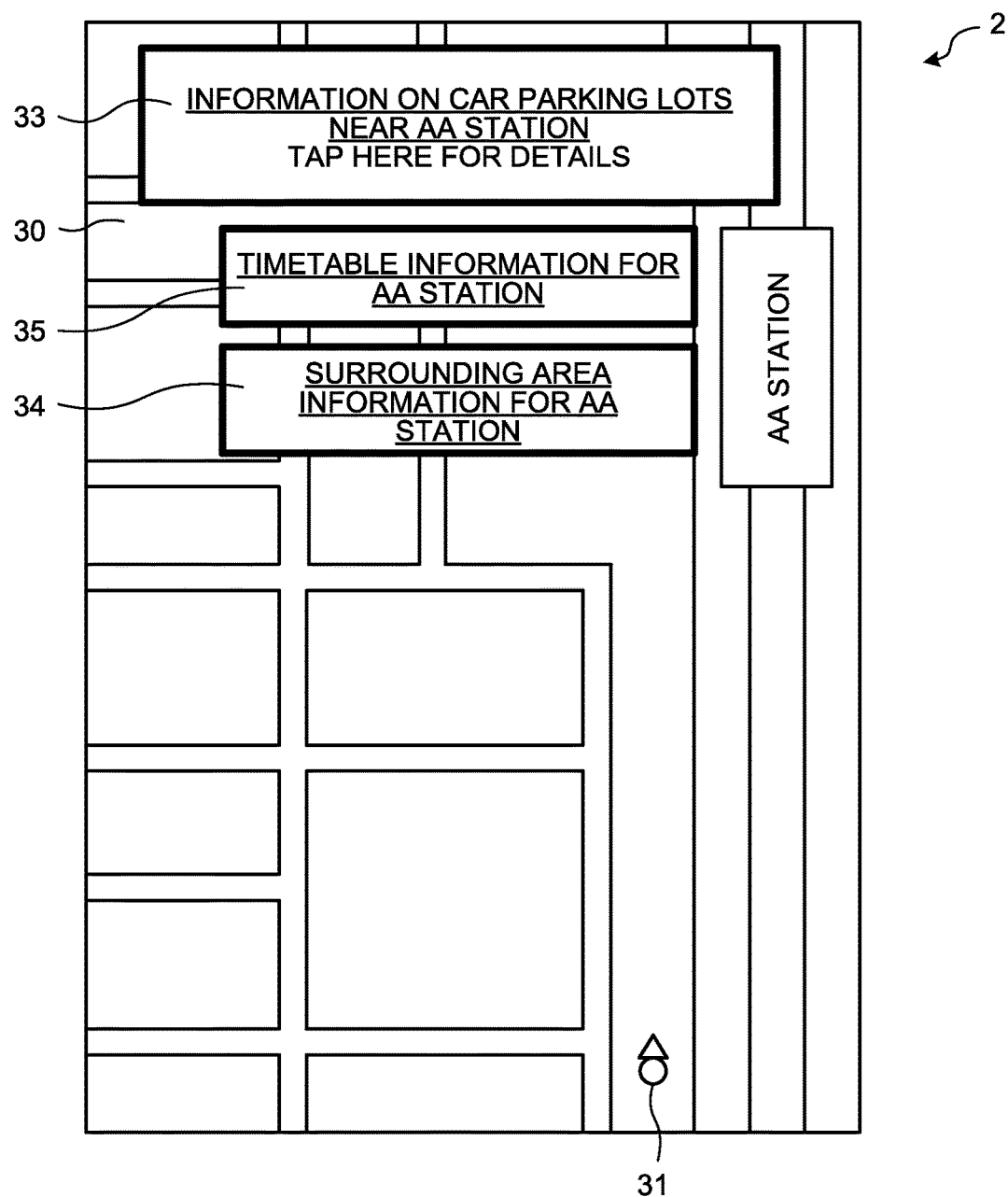
FIG. 9 is a diagram illustrating a specific example of the information presentation in a case where the movement state is "car".

FIG. 9 is a diagram illustrating a specific example of the information presentation in a case where the movement state is "car". Also in a scene illustrated in FIG. 9, the current position of the mobile electronic device 1b is present within the range of the predetermined distance of "AA station". In this example, a place approached closer than the predetermined distance is "AA station" and the movement state is "car". Accordingly, the mobile electronic device 1b acquires information relating to "AA station" from the condition table 23b and displays these items of the information on the basis of the priority orders, namely, in the order of "D", "B", and "A".

In the example illustrated in FIG. 9, the mobile electronic device 1b displays, as the pop-up 33, "information on car parking lots near AA station" corresponding to the reference character of "D" having the highest priority order at an uppermost section in a largest size. Additionally, the mobile electronic device 1b displays, as the pop-ups 35 and 34, "timetable information for AA station" and "surrounding area information for AA station" corresponding to the reference characters of "B" and "A" having the second highest priority orders, respectively, below the pop-up 33 in a smaller size than the size of the pop-up 33.

Both of FIGS. 8 and 9 illustrate a scene where the current position of the mobile electronic device 1b is present within the range of the predetermined distance of "AA station". However, because the determined movement states differ between FIG. 8 and FIG. 9, different information from each other is given a priority between FIG. 8 and FIG. 9 when displayed on the display 2 as information relating to "AA station".

Figure 10:
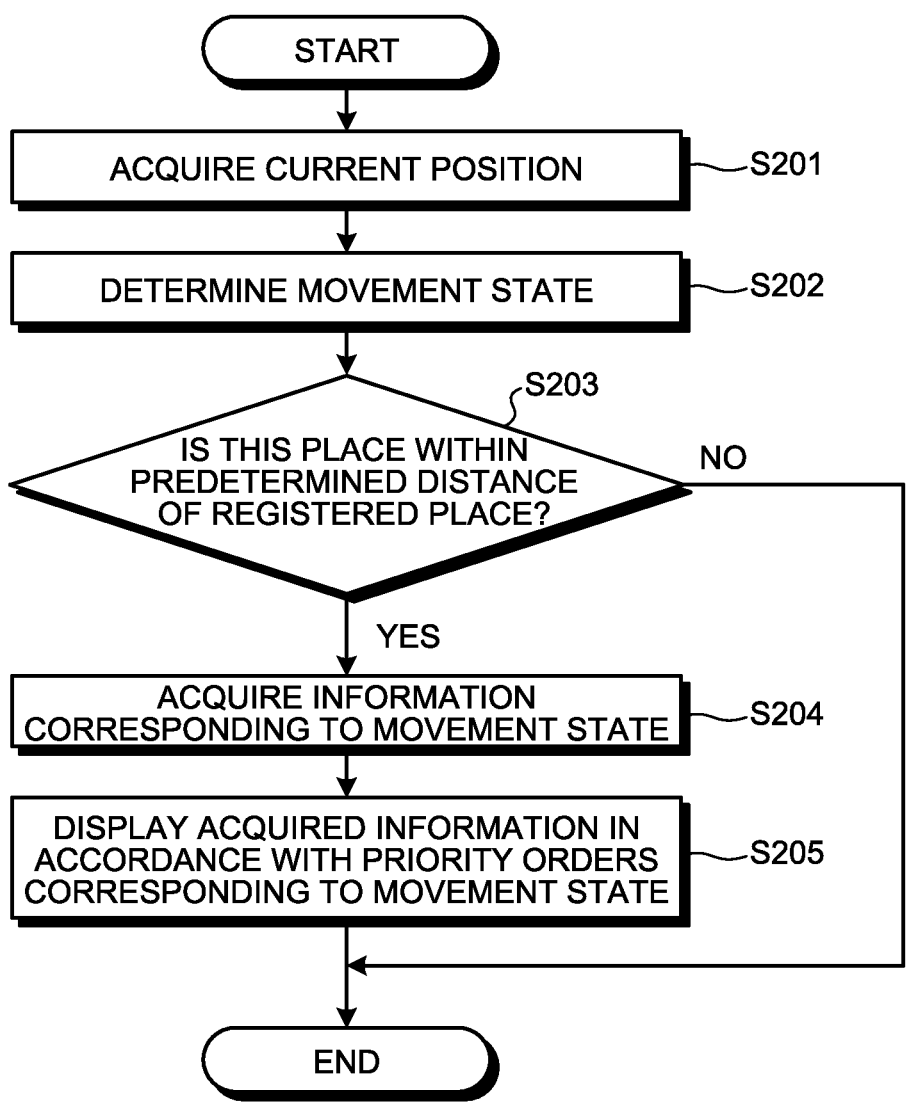
FIG. 10 is a flowchart illustrating an exemplary information provision action by the mobile electronic device.

FIG. 10 is a flowchart illustrating an exemplary information provision action by the mobile electronic device 1b. The action illustrated in FIG. 10 is realized when the controller 10 executes the information provision code 22b. The action illustrated in FIG. 10 is repeatedly carried out during a period while the information provision function is enabled.

As illustrated in FIG. 10, the controller 10 acquires the current position at step S201 by using the positioning unit 5. Additionally, the controller 10 determines the movement state at step S202.

Subsequently, at step S203, the controller 10 determines whether the mobile electronic device 1b has entered an area within the predetermined distance of a certain place registered in the condition table 23b.

When the mobile electronic device 1b has entered the area within the predetermined distance of the certain place registered in the condition table 23b (step S203: Yes), the controller 10 proceeds to step S204. At step S204, the controller 10 reads from the condition table 23b, information relating to the place of which the area within the predetermined distance has been entered. Thereafter, the controller 10 displays the read information on the display 2 at step S205 in accordance with the priority orders corresponding to the movement state, namely, by putting a priority on the information corresponding to the movement state. When the mobile electronic device 1b has not entered the area within the predetermined distance of the certain place registered in the condition table 23b (step S203: No), step S204 and step S205 are not carried out.

Figure 11:
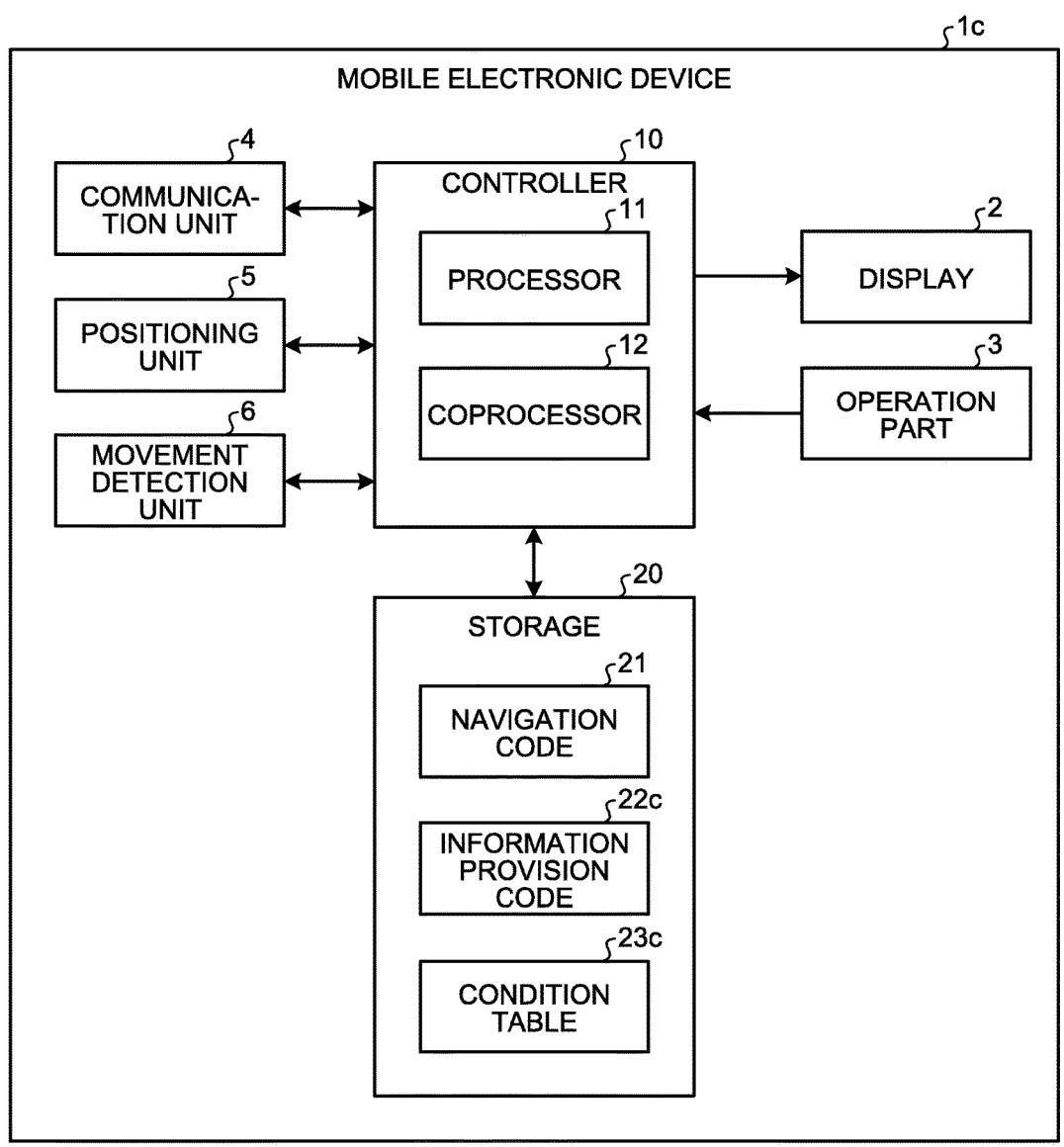
FIG. 11 is a block diagram of a mobile electronic device according to an exemplary embodiment.

FIG. 11 is a block diagram of a mobile electronic device 1c according to an exemplary embodiment. In the mobile electronic device 1c, the storage 20 stores an information provision code 22c instead of the information provision code 22a and stores a condition table 23c instead of the condition table 23a. The other configurations of the mobile electronic device 1c are similar to those of the mobile electronic device 1a.

The information provision code 22c provides a function to determine the movement state of the user and display information corresponding to the determined movement state and the time for the user. In other words, the information provision code 22c differs from the information provision code 22a in additionally considering the time when providing information. Even regarding one and the same place, there is a case where a service only provided for a particular time period or a product or a service whose condition or fee varies depending on a time period is provided. When information is provided in accordance with the movement state and the time, further appropriate information can be provided to the user.

FIG. 12 is a diagram illustrating an exemplary condition table 23c. Information relating to a place corresponding to the positional information is classified by the movement states while being associated with the positional information and the time period when stored in the condition table 23c.

The condition table 23c associates information of "surrounding area information for AA station" and "lunch information near AA station" with "AA station" of which the position is located by positional information of "xxxxxxx" to store by classifying into the movement state of "walking". "Lunch information near AA station" is information regarding lunch menus of restaurants near the AA station. "Lunch information near AA station" is associated with a time period of "12:00 to 14:00", whereas "surrounding area information for AA station" is associated with another time period.

A lunch menu is only provided during a time period around noon. Furthermore, a user who walks to a station is assumed to have a strong possibility of having a free time for strolling near the station and having a lunch near the station particularly during a time period around noon. On the basis of such an assumption, "lunch information near AA station" is associated with the positional information of "xxxxxxx" and the time period of "12:00 to 14:00" while being classified into the movement state of "walking" when stored. Additionally, "surrounding area information for AA station" is associated with the positional information of "xxxxxxx" and the other time period while being classified into the movement state of "walking" when stored.

The condition table 23c associates information of "timetable information for AA station (morning)", "timetable information for AA station (afternoon)" and "timetable information for AA station (evening)" with "AA station" of which the position is located by the positional information of "xxxxxxx" to store by classifying into the movement state of "running". "Timetable information for AA station (morning)" is information regarding a train timetable at the AA station in the morning, "timetable information for AA station (afternoon)" is information regarding a train timetable at the AA station from noon to the evening, and "timetable information for AA station (evening)" is information regarding a train timetable at the AA station in the evening. "Timetable information for AA station (morning)" is associated with a time period of "00:00 to 12:00", "timetable information for AA station (afternoon)" is associated with a time period of "12:00 to 18:00", and "timetable information for AA station (evening)" is associated with a time period of "18:00 to 24:00".

A user who runs to a station has a strong possibility of trying to take a train quickly. Additionally, that user has a strong possibility of wanting to know which train he/she should take at the current time period. On the basis of such an assumption, "timetable information for AA station (morning)" is associated with the positional information of "xxxxxxx" and the time period of "0:00 to 12:00" while being classified into the movement state of "running" when stored. "Timetable information for AA station (afternoon)" is associated with the positional information of "xxxxxxx" and the time period of "12:00 to 18:00" while being classified into the movement state of "running" when stored. Additionally, "timetable information for AA station (evening)" is associated with the positional information of "xxxxxxx" and the time period of "18:00 to 24:00" while being classified into the movement state of "running" when stored.

The condition table 23c associates information of "information on car parking lots near AA station (nighttime fee)" and "information on car parking lots near AA station (regular fee)" with "AA station" of which the position is located by the positional information of "xxxxxxx" to store by classifying into the movement state of "car". "Information on car parking lots near AA station (nighttime fee)" is information regarding car parking lots near the AA station, including car parking fees at night, whereas "information on car parking lots near AA station (regular fee)" is information regarding car parking lots near the AA station, including car parking fees at regular time. "Information on car parking lots near AA station (regular fee)" is associated with a time period of "8:00 to 22:00", whereas "information on car parking lots near AA station (nighttime fee)" is associated with another time period.

A fee for the car parking lot sometimes differs depending on time periods. Therefore, a user who comes to a station by car is assumed to want to know which car parking lot has a low car parking fee at the current time period. On the basis of such an assumption, "information on car parking lots near AA station (regular fee)" is associated with the positional information of "xxxxxxx" and the time period of "8:00 to 22:00" while being classified into the movement state of "car" when stored. Additionally, "information on car parking lots near AA station (nighttime fee)" is associated with the positional information of "xxxxxxx" and the other time period while being classified into the movement state of "car" when stored.

FIG. 13 is a flowchart illustrating an exemplary information provision action by the mobile electronic device 1c. The action illustrated in FIG. 13 is realized when the controller 10 executes the information provision code 22c. The action illustrated in FIG. 13 is repeatedly carried out during a period while the information provision function is enabled.

As illustrated in FIG. 13, the controller 10 acquires the current position at step S301 by using the positioning unit 5. The controller 10 determines the movement state at step S302. Additionally, the controller 10 acquires the current time at step S303.

Subsequently, at step S304, the controller 10 determines whether the mobile electronic device 1c has entered an area within the predetermined distance of a certain place registered in the condition table 23c. Whether an area within the predetermined distance of a certain place registered in the condition table 23c has been entered can be determined through the comparison between the acquired current position and the individual positional information of a place registered in the condition table 23c.

When the mobile electronic device 1c has entered the area within the predetermined distance of the certain place registered in the condition table 23c (step S304: Yes), the controller 10 proceeds to step S305. At step S305, among information relating to the place of which the area within the predetermined distance has been entered, the controller 10 reads information corresponding to the movement state determined at step S302 and the time acquired at step S303 from the condition table 23c. Thereafter, the controller 10 displays the read information on the display 2 at step S306. When the mobile electronic device 1c has not entered the area within the predetermined distance of the certain place registered in the condition table 23c (step S304: No), step S305 and step S306 are not carried out.

Figure 14:
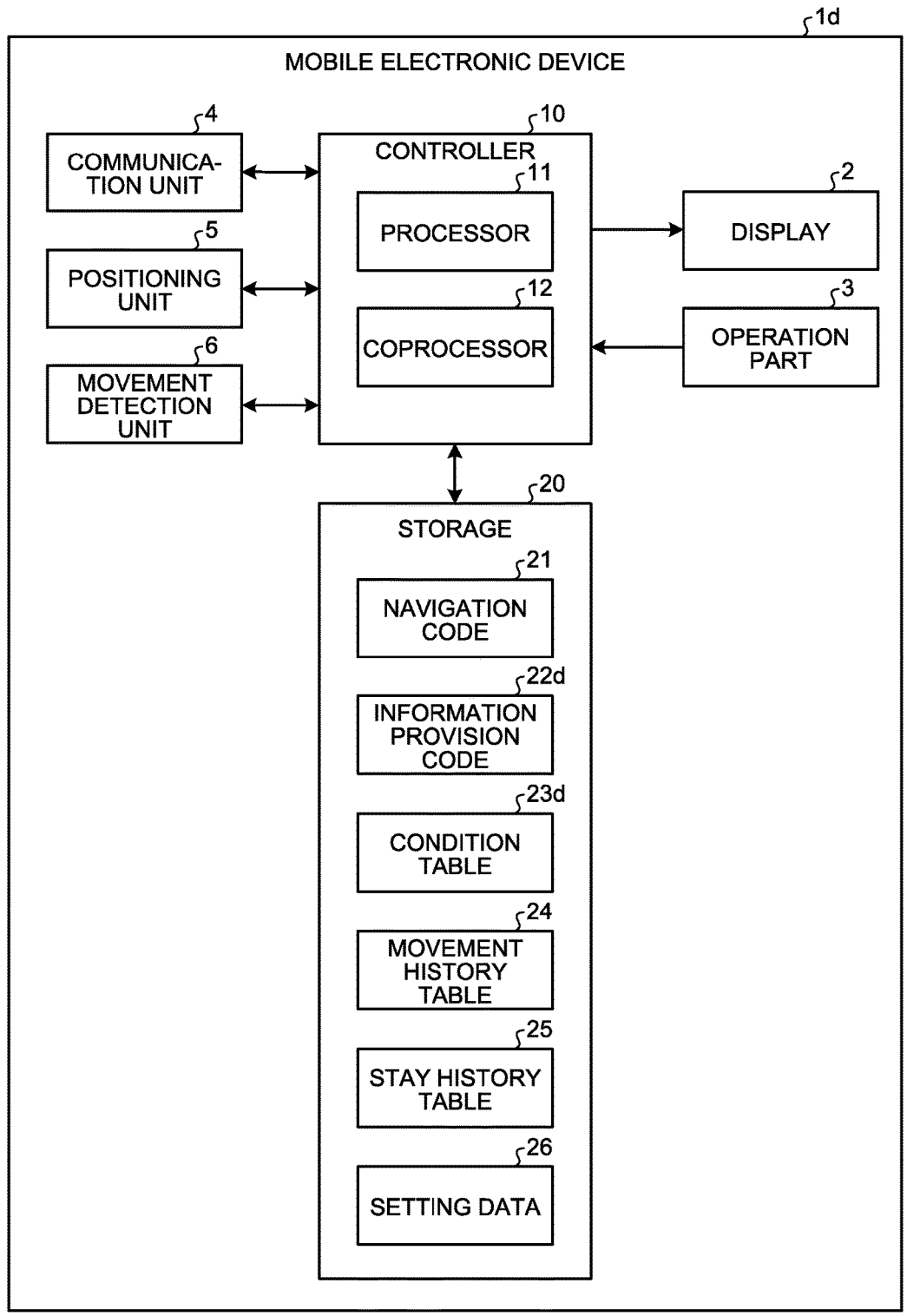
FIG. 14 is a block diagram of a mobile electronic device according to an exemplary embodiment.

FIG. 14 is a block diagram of a mobile electronic device 1d according to an exemplary embodiment. In the mobile electronic device 1d, the storage 20 stores an information provision code 22d instead of the information provision code 22a and stores a condition table 23d instead of the condition table 23a. The condition table 23d is the same table as one of the aforementioned condition table 23a to condition table 23c. The following description will assume that the condition table 23d is the same table as the aforementioned condition table 23c. The storage 20 additionally stores a movement history table 24, a stay history table 25, and setting data 26. The other configurations of the mobile electronic device 1d are similar to those of the mobile electronic device 1a.

The information provision code 22d provides a function to predict a destination of the user on the basis of an activity history of the user that has been recorded while determining the movement state of the user and display information corresponding to the determined movement state and the destination for the user at a time point before the arrival at the destination by a predetermined time span. In other words, the information provision code 22d differs from the information provision code 22a in providing information in a case where the predicted destination is being approached. Even when approaching a place registered in advance, the user does not always stop by that place. Information regarding a place merely regarded as a place only passed through is not useful for the user in some cases even though that information is displayed. By predicting the destination and providing information only when the predicted destination is being approached, a possibility of providing useless information to the user is reduced.

The "destination" according to an embodiment includes not only a last place the user is heading for but also a feature place the user goes past before arriving at the last place the user is heading for. Examples of the feature place include, but are not limited to, a place where the user stays longer than a predetermined time span, a place where the movement state changes, etc. For example, when the user stays at a shopping center longer than the predetermined time span while the movement state of "walking" continues, that shopping center is regarded as the feature place. For example, when the movement state changes from "walking" to "train" by taking a train at a station, that station is regarded as the feature place.

According to the function provided by the information provision code 22d, the activity history of the user is recorded in the movement history table 24 and the stay history table 25 to predict the destination of the user. The movement history table 24 records how the movement state has been switched. The movement history table 24 records a place and a date and time at which the continuation of the movement state started and a place and a date and time at which the continuation of the movement state ended. The stay history table 25 records a place where the user has stayed longer than the predetermined time span. The stay history table 25 also records a date and time when the stay started and a date and time when the stay ended.

The information provision code 22d is capable of predicting the destination of the user on the basis of the activity history that has been recorded. For example, a place where the movement state of a type similar to that of the current movement state ended the largest number of times after being started on a day of the week at a time period similar to those of the current movement state is predicted as a current destination of the user. Furthermore, in a case where there is a place where the user stayed longer than the predetermined time span at a frequency higher than a predetermined frequency between a start date and time and an end date and time of the movement state of a type similar to that of the current movement state after being started on a day of the week at a time period similar to those of the current movement state, that place is also predicted as a current destination of the user.

Parameters used to predict the destination of the user such as the time span and the frequency are stored in the setting data 26. The mobile electronic device 1d may be configured such that the user can set values of these parameters arbitrarily.

Figure 15:
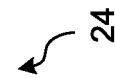
FIG. 15 is a diagram illustrating a specific example of a movement history table.

FIG. 15 is a diagram illustrating a specific example of the movement history table 24. FIG. 16 is a diagram illustrating a specific example of the stay history table 25. FIGS. 15 and 16 illustrate an exemplary history recorded in a case where the user walked to the AA station from his/her home, took a train from the AA station to a CC station, walked from the CC station to a DD building, worked at the DD building while placing the mobile electronic device 1d on a desk, walked from the DD building to the CC station, took a train from the CC station to the AA station, and stopped by a BB mall on the way home from the AA station by walk.

Configurations of the tables in which the activity history of the user is recorded are not limited to the examples illustrated in FIGS. 15 and 16 and only required to be configured such that the prediction of the destination based on the activity history is possible.

Figure 17:
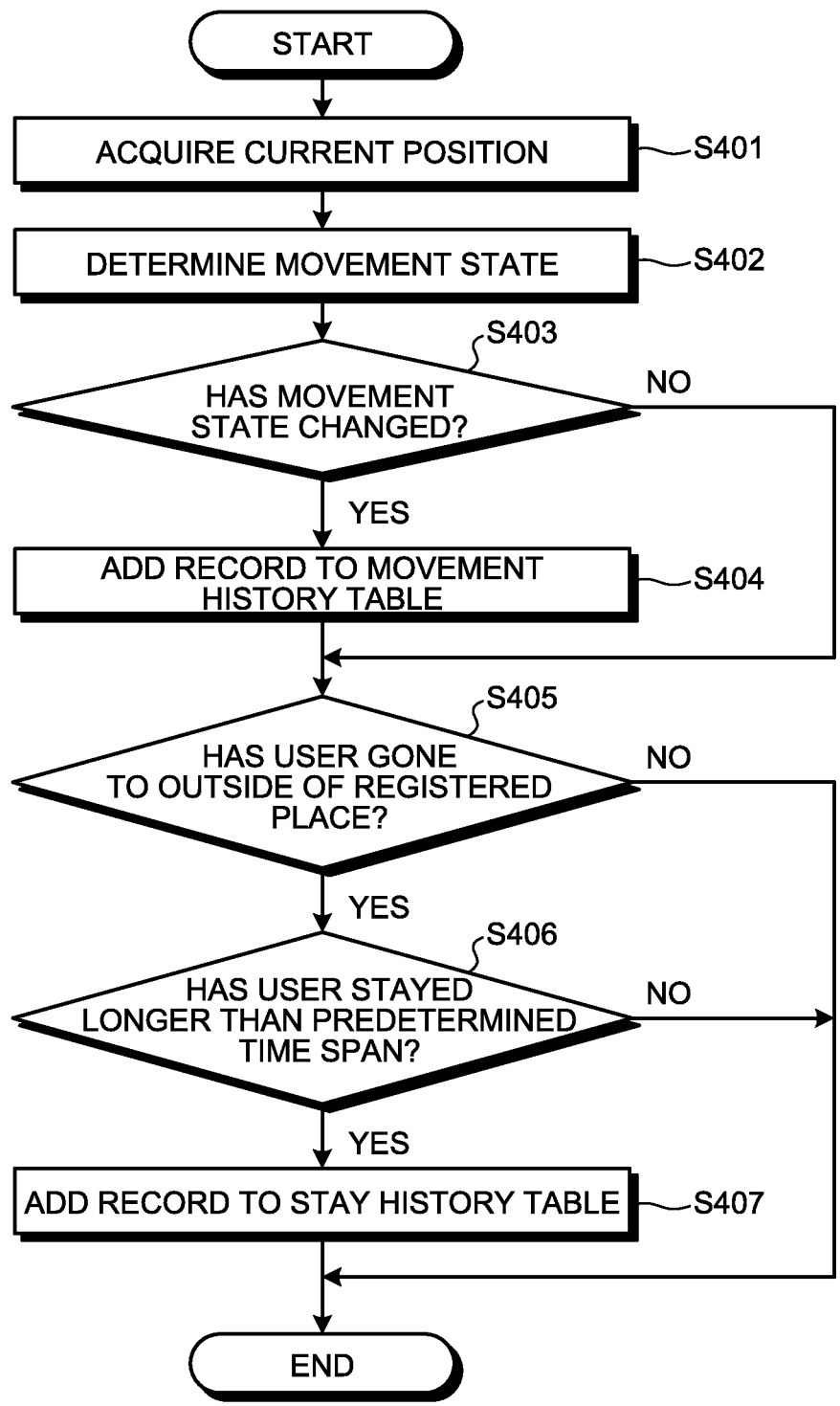
FIG. 17 is a flowchart illustrating an exemplary history recording action by the mobile electronic device.

FIG. 17 is a flowchart illustrating an exemplary history recording action by the mobile electronic device 1d. The action illustrated in FIG. 17 is realized when the controller 10 executes the information provision code 22d. The action illustrated in FIG. 17 is repeatedly carried out.

As illustrated in FIG. 17, the controller 10 acquires the current position at step S401 by using the positioning unit 5. Additionally, the controller 10 determines the movement state at step S402.

Subsequently, the controller 10 determines whether the movement state has changed at step S403. Whether the movement state has changed can be determined by comparing the movement state determined at step S402 with the movement state previously determined. When the movement state has changed (step S403: Yes), the controller 10 proceeds to step S404. At step S404, the controller 10 adds, to the movement history table 24, a record including information such as the type of the movement state before change, a start date and time and a start place at which the detection of the movement state before change started, and an end date and time and an end place at which the detection of the movement state before change ended. When the movement state has not changed (step S403: No), step S404 is not carried out.

Subsequently, at step S405, the controller 10 determines whether the user has gone to the outside of a place registered in the condition table 23d. The controller 10 can determine whether the user has gone to the outside of the registered place by comparing the current position acquired at step S401 with the current position previously acquired. When the user has gone to the outside of the registered place (step S405: Yes), the controller 10 proceeds to step S406.

At step S406, the controller 10 determines whether the user has stayed at the registered place longer than the predetermined time span. When the user has stayed at the registered place longer than the predetermined time span (step S406: Yes), the controller 10 proceeds to step S407. At step S407, the controller 10 adds a record including information such as the registered place, a start date and time of the stay, an end date and time of the stay to the stay history table 25.

When the user has not gone to the outside of the registered place (step S405: No) or when the user has not stayed at the registered place longer than the predetermined time span (step S406: No), step S407 is not carried out.

Figure 18:
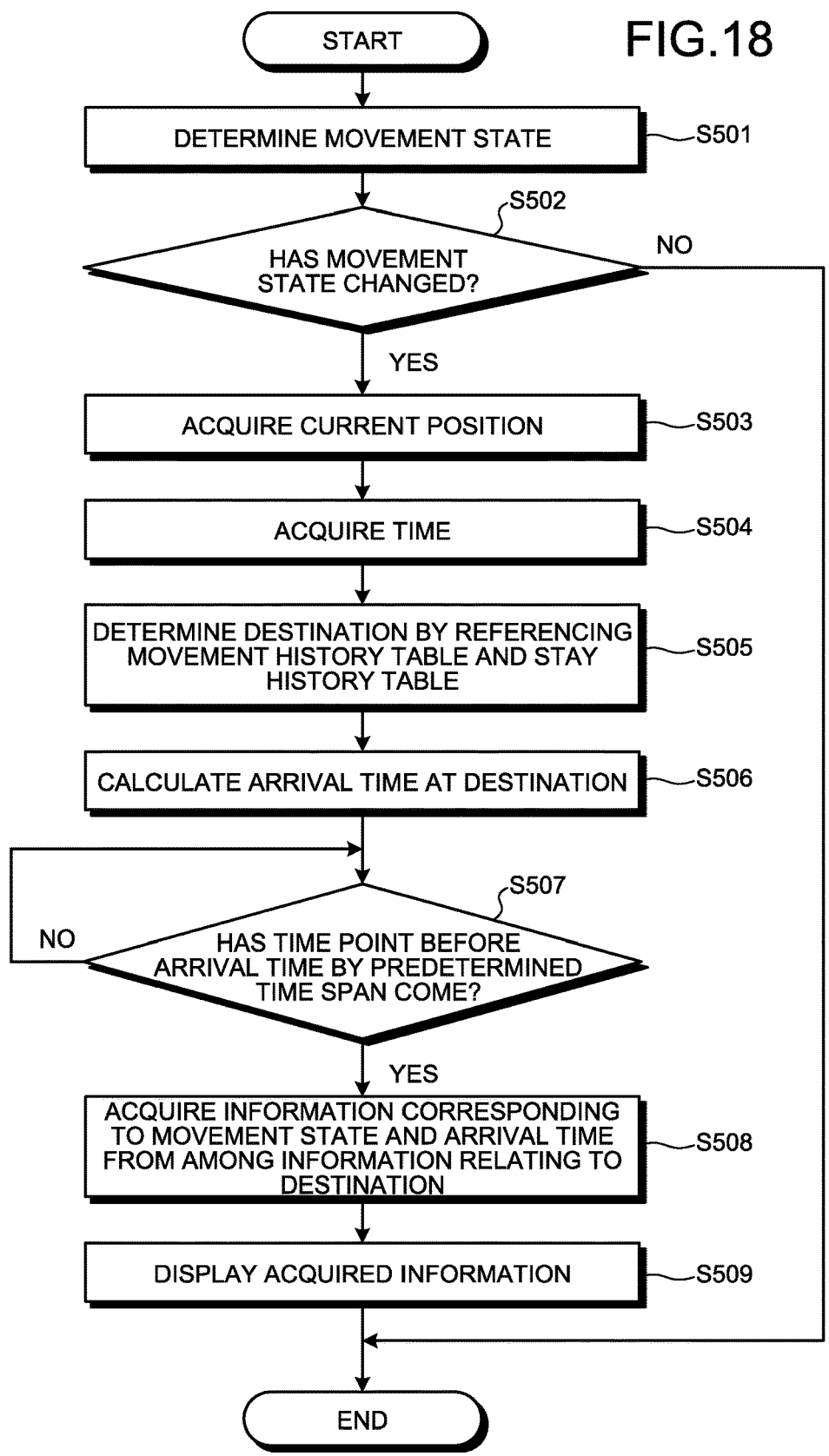
FIG. 18 is a flowchart illustrating an exemplary information provision action by the mobile electronic device.

FIG. 18 is a flowchart illustrating an exemplary information provision action by the mobile electronic device 1d. The action illustrated in FIG. 18 is realized when the controller 10 executes the information provision code 22d. The action illustrated in FIG. 18 is repeatedly carried out during a period while the information provision function is enabled. The "period while the information provision function is enabled" means, for example, a period while the navigation code 21 is executed.

As illustrated in FIG. 18, the controller 10 determines the movement state at step S501. Subsequently, the controller 10 determines whether the movement state has changed at step S502. When the movement state has changed (step S502: Yes), the controller 10 proceeds to step S503. When the movement state has not changed (step S502: No), step S503 and subsequent processing tasks are not carried out.

The controller 10 acquires the current position at step S503 by using the positioning unit 5. Additionally, the controller 10 acquires the current time at step S504. Thereafter, the controller 10 determines the destination of the user at step S505 by referencing the movement history table 24 and the stay history table 25. Furthermore, the controller 10 calculates arrival time at the determined destination at step S506. For example, the arrival time can be calculated by using a required movement time in a past activity recorded in the movement history table 24, a typical movement speed corresponding to the current movement state, timetable information on a public transportation facility corresponding to the current movement state, and so on.

Subsequently, the controller 10 determines whether a time point before the arrival time by the predetermined time span has come at step S507. The predetermined time span represents a time span enough for the user to acknowledge provided information before arriving at the destination. The predetermined time span is stored in, for example, the setting data 26 in advance. The predetermined time span may be set for each of the movement states. The mobile electronic device 1d may be configured such that the user can set the predetermined time span arbitrarily. The controller 10 may determine whether to have come closer to the destination by determining whether a distance to the destination has become shorter than a predetermined distance instead of determining whether a time point before the arrival time by the predetermined time span has come.

When the time point before the arrival time by the predetermined time span has not come (step S507: No), the controller 10 carries out the determination at step S507 again. When the time point before the arrival time by the predetermined time span has come (step S507: Yes), the controller 10 proceeds to step S508. At step S508, among information relating to the determined destination, the controller 10 reads information corresponding to the movement state determined at step S501 and the arrival time calculated at step S506 from the condition table 23d. Thereafter, the controller 10 displays the read information on the display 2 at step S509.

In another exemplary embodiment, part of the function carried out by each of the aforementioned mobile electronic devices within these mobile electronic devices is carried out by a server capable of communicating with the mobile electronic device via a network.

Figure 19:
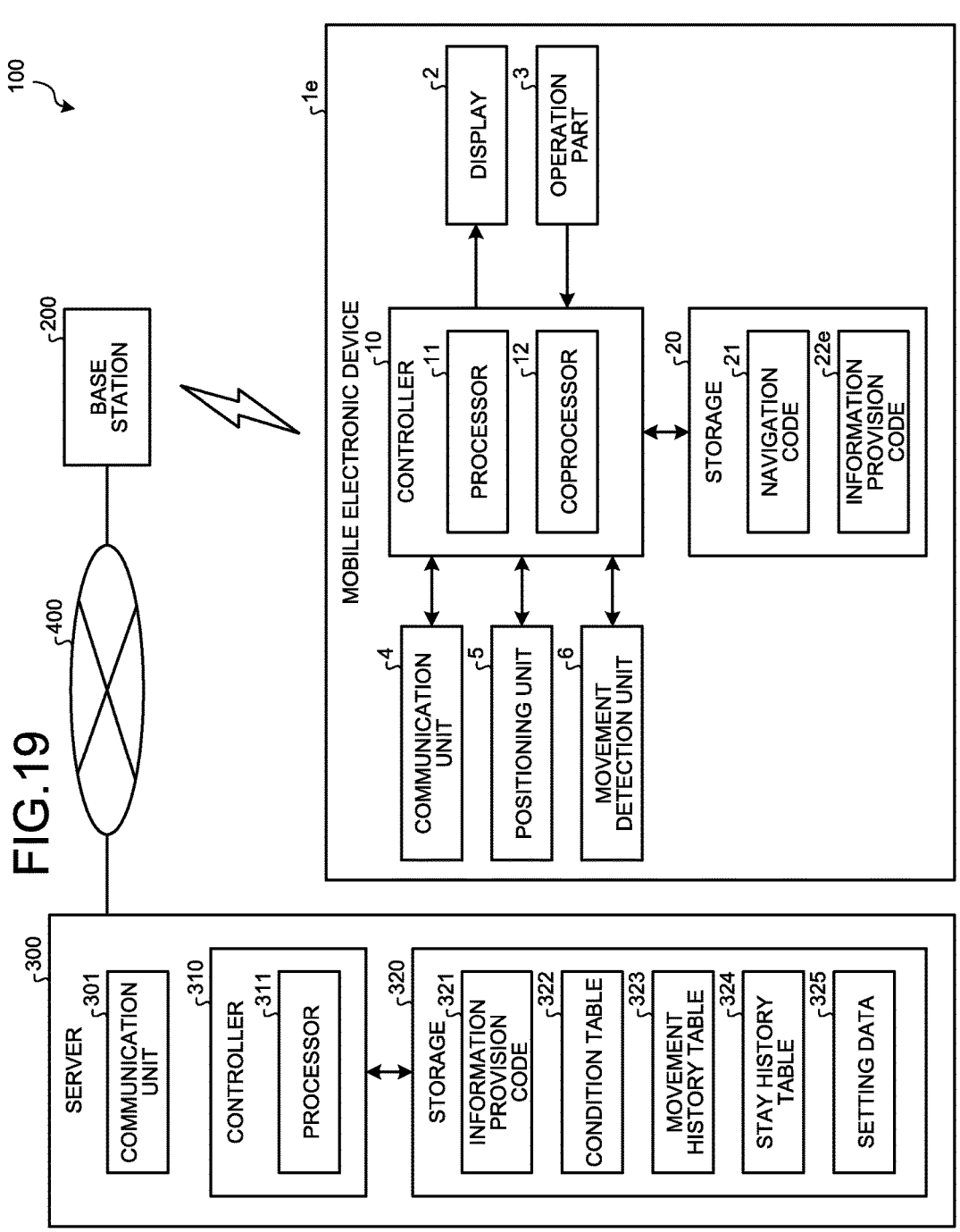
FIG. 19 is a diagram illustrating an exemplary configuration of a system according to an exemplary embodiment.

FIG. 19 is a diagram illustrating an exemplary configuration of a system 100 according to an exemplary embodiment. The system 100 includes a mobile electronic device 1e and a server 300. The server 300 is connected to a network 400. The mobile electronic device 1e is connected to the network 400 through wireless communication with a base station 200. With such a configuration, the mobile electronic device 1e and the server 300 are enabled to communicate with each other.

The configuration of the system 100 is not limited to the example illustrated in FIG. 19 and only required to be configured such that the mobile electronic device 1e and the server 300 can communicate with each other. The system 100 may include the plurality of mobile electronic devices having a configuration similar to that of the mobile electronic device 1e.

As illustrate in FIG. 19, in the mobile electronic device 1e, the storage 20 stores an information provision code 22e instead of the information provision code 22a but does not store data for the information provision function such as the condition table 23a. The other configurations of the mobile electronic device 1e are similar to those of the mobile electronic device 1a.

The server 300 includes a communication unit 301, a controller 310, and a storage 320. The communication unit 301 enables data communication with another apparatus through the network 400.

The controller 310 controls the entire server 300. The controller 310 includes a processor 311. The processor 311 is a computational processing apparatus. The processor 311 executes various types of codes stored in the storage 320 to realize various types of functions of the server 300. Specifically, the processor 311 carries out various types of control by executing instructions included in the code while referencing data acquired from respective units and the display 2 of the server 300 and a result of computational processing.

The storage 320 stores a code and data. The storage 320 is also used as a working area temporarily storing a processing result of the controller 310. The storage 320 may include any non-transitory storage medium such as a semiconductor storage medium or a magnetic storage medium. The storage 320 may include a plurality of types of storage media. The storage 320 may include a combination of a transportable non-transitory storage medium such as a memory card, an optical disc, or a magneto-optical disk and a reading apparatus for the storage medium. The storage 320 may include a storage device used as a temporary storage area such as a random access memory (RAM).

The storage 320 stores, for example, an information provision code 321. The storage 320 additionally stores data for the information provision function. The data for the information provision function is, for example, a condition table 322 equivalent to the condition table 23d illustrated in FIG. 14, a movement history table 323 equivalent to the movement history table 24 illustrated therein, a stay history table 324 equivalent to the stay history table 25 illustrated therein, and setting data 325 equivalent to the setting data 26 illustrated therein.

The data for the information provision function is configured in such a manner as to be able to determine which of the mobile electronic devices corresponds to each of records included in the data. Specifically, the data for the information provision function has a configuration in which an item storing identification information for identifying the corresponding mobile electronic device or user is added to each of the aforementioned records of the data.

As described above, the server may be caused to carry out part of the function carried out by the aforementioned mobile electronic devices by enabling the mobile electronic device 1e and the server 300 to communicate with each other and arranging at least part of the data for the information provision function in the server 300.

Figure 20:
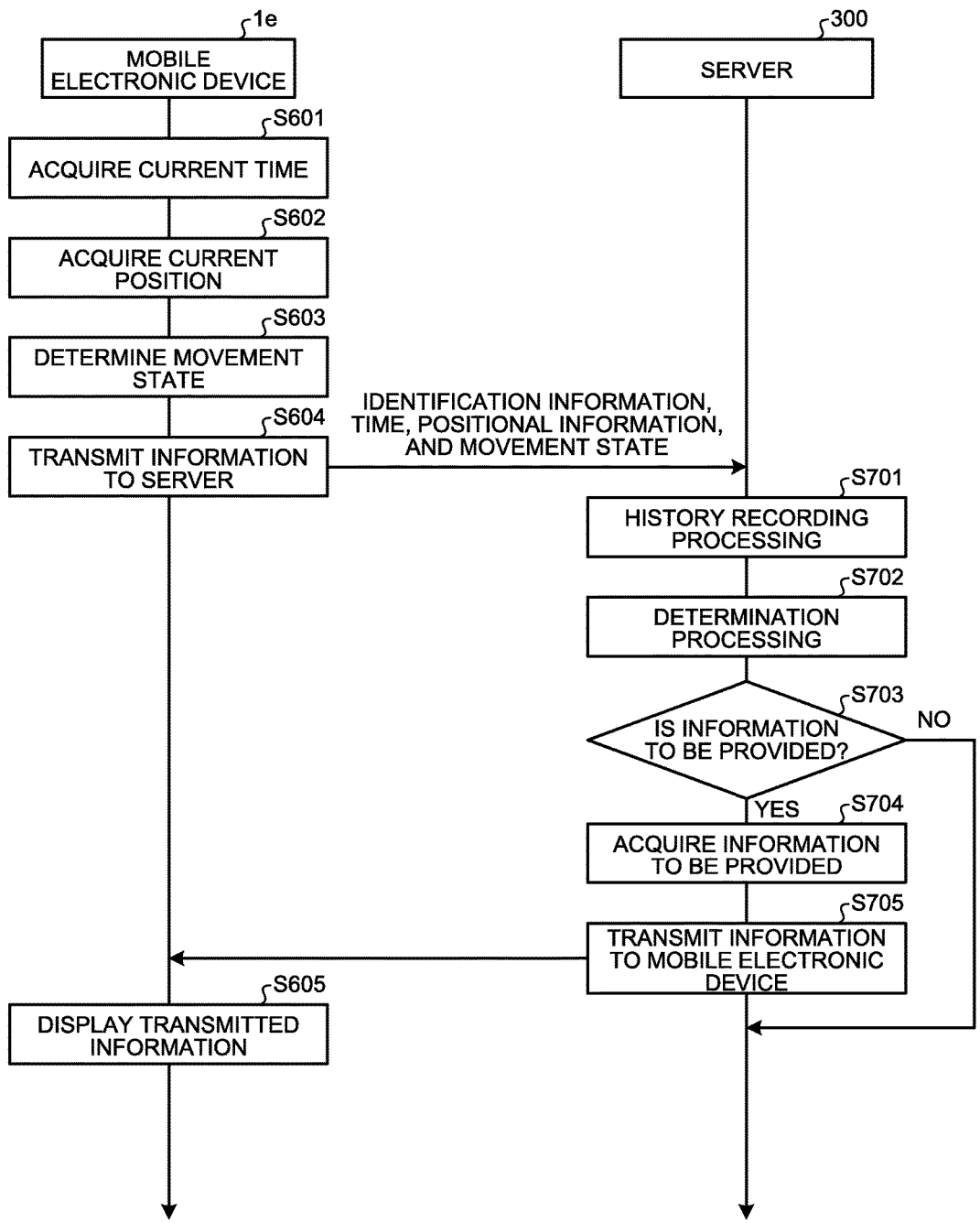
FIG. 20 is a sequence diagram illustrating an exemplary action of the system.

FIG. 20 is a sequence diagram illustrating an exemplary action of the system 100. The mobile electronic device 1e carries out step S601 to step S605 in FIG. 20 repeatedly by causing the controller 10 to execute the information provision code 22e. The server 300 carries out step S701 to step S705 in FIG. 20 repeatedly by causing the controller 310 to execute the information provision code 321. The action by the server 300 from step S701 to step S705 is carried out for each of the mobile electronic devices.

The mobile electronic device 1e acquires the current time at step S601. Additionally, the mobile electronic device 1e acquires the current position at step S602 by using the positioning unit 5. Furthermore, the mobile electronic device 1e determines the movement state at step S603.

Thereafter, the mobile electronic device 1e transmits information to the server 300 at step S604. The information to be transmitted to the server includes the identification information for identifying the mobile electronic device 1e or the user, the time acquired at step S601, the positional information acquired at step S602, and the movement state determined at step S603.

Upon receiving the transmitted information, the server 300 carries out history recording processing at step S701. In the history recording processing, the activity history is recorded in the movement history table 323 and the stay history table 324 as necessary through an action similar to the history recording action illustrated in FIG. 17.

Subsequently, the server 300 carries out determination processing to determine whether to provide information to the user at step S702. In the determination processing, the necessity of providing information is determined through an action similar to step S502 to step S507 of the information provision action illustrated in FIG. 18. When it is determined that information is not to be provided to the user (S703: No), subsequent processing procedures are not carried out.

When it is determined that information is to be provided to the user (S703: Yes), the server 300 proceeds to step S704. The server 300 acquires information to be provided at step S704. Specifically, among information relating to the determined destination, the server 300 reads information corresponding to the calculated arrival time from the condition table 322, as in step S508 of the information provision action illustrated in FIG. 18. Thereafter, the server 300 transmits the acquired information to the mobile electronic device 1e at step S705.

Upon receiving the transmitted information, the mobile electronic device 1e displays the transmitted information on the display 2 at step S605.

The arrangement of the functions and the data illustrated in FIGS. 19 and 20 is an example and the embodiment is not limited thereto. For example, the server 300 may solely carry out one of the history recording processing and the determination processing on the basis of the information transmitted from the mobile electronic device 1e such that the mobile electronic device 1e carries out the other processing. Alternatively, the mobile electronic device 1e may carry out the history recording processing and the determination processing such that the server 300 solely searches the condition table 322 and makes a reply regarding a search result in response to a request from the mobile electronic device 1e.

FIGS. 19 and 20 have illustrated an example where the function similar to that of the mobile electronic device 1d is realized by the mobile electronic device 1e and the server 300 working in coordination with each other. However, the function similar to that of the mobile electronic device according to another embodiment may be realized by the mobile electronic device 1e and the server 300 working in coordination with each other.

Some embodiments disclosed in this application can be modified without departing from the spirit and the scope of the invention. Furthermore, some embodiments disclosed in this application and modifications thereof can be combined as necessary.

For example, the above-described mobile electronic device may be modified in such a manner as to solely display the information corresponding to the movement state. For example, the above-described mobile electronic device may be modified in such a manner as to put a priority on the information corresponding to the movement state to display. For example, the above-described mobile electronic device may be modified in such a manner as to display the information corresponding to the movement state and the time. For example, the above-described mobile electronic device may be modified in such a manner as to predict the destination and display information when coming closer to the predicted destination.

The above-described code may be divided into a plurality of modules, or alternatively, may be coupled with another code.

FIGS. 3, 4, 8, and 9 have illustrated an example where the information corresponding to the movement state overlaps a portion of a screen for navigation when displayed. However, a way of displaying the information corresponding to the movement state is not limited thereto. For example, the information corresponding to the movement state may overlap substantially the entire screen for navigation when displayed. The information corresponding to the movement state may be displayed by using a notification screen. The notification screen is a screen listing various types of information for the user to be notified. The user is informed that the information corresponding to the movement state has been added to the notification screen by way of icon display on a predetermined area of the display 2, a notification sound, vibration, or the like. The information corresponding to the movement state may be displayed within a widget provided by a code other than the navigation code 21 so as to be arranged on the screen.

The invention claimed is:

1. A mobile electronic device comprising:
a storage configured to store a plurality of items of information including a first item of information and a second item of information;
a display configured to display the first item of information and the second item of information; and
a controller configured to
cause the display to display a screen,
in response to that a movement state of the mobile electronic device is determined to be a first movement state,
cause the display to maintain displaying the screen and to start displaying an item based on the first item of information in accordance with the first movement state among the plurality of items of information at a first position on the screen, and
in response to that a movement state of the mobile electronic device is determined to be a second movement state,
cause the display to maintain displaying the screen and to start displaying, instead of the item based on the first item of information, an item based on the second item of information in accordance with the second movement state among the plurality of items of information at the first position on the screen.

2. A mobile electronic device comprising:
a storage configured to store a plurality of items of information including a first item of information and a second item of information;
a display configured to display the first item of information and the second item of information; and
a controller configured to
display an item based on the first item of information among the plurality of items of information at a first position on the display and display an item based on the second item of information among the plurality of items of information at a second position on the display when a movement state of the mobile electronic device is determined to be a first movement state, and
display an item based on the first item of information among the plurality of items of information at the second position on the display and display an item based on the second item of information among the plurality of items of information at the first position on the display when the movement state of the mobile electronic device is determined to be a second movement state.

3. The mobile electronic device according to claim 1, wherein
the first and second items of information are individually associated with positional information, and
the controller is configured to
display the item based on the first item of information at the first position on the display when the movement state of the electronic device is determined to be the first movement state and the positional information associated with the first item of information satisfies a predetermined relationship with a current position of the mobile electronic device, and
display the item based on the second item of information at the first position on the display when the movement state of the electronic device is determined to be the second movement state and the positional information associated with the second item of information satisfies the predetermined relationship with the current position of the mobile electronic device.

4. The mobile electronic device according to claim 2, wherein
the first and second items of information are individually associated with positional information, and
the controller is configured to
display the item based on the first item of information at the first position on the display and display the item based on the second item of information at the second position on the display when the movement state of the electronic device is determined to be the first movement state and the positional information associated with the first item of information satisfies a predetermined relationship with a current position of the mobile electronic device, and
display the item based on the first item of information at the second position on the display and display the item based on the second item of information at the first position on the display when the movement state of the mobile electronic device is determined to be the second movement state and the positional information associated with the second item of information satisfies the predetermined relationship with the current position of the mobile electronic device.

5. An information provision system comprising a server and a mobile electronic device, wherein
the server is configured to store a plurality of items of information including a first item of information and a second item of information, and
the mobile electronic device is configured to
cause a display of the mobile electronic device to display a screen, in response to that a movement state of the mobile electronic device is determined to be a first movement state,
   cause the display to maintain displaying the screen and to start displaying an item based on the first item of information in accordance with the first movement state of the mobile electronic device among the plurality of items of information at a first position on the screen, and in response to that a movement state of the mobile electronic device is determined to be a second movement state,
   cause the display to maintain displaying the screen and to start displaying, instead of the item based on the first item of information, an item based on the second item of information in accordance with the second movement state among the plurality of items of information at the first position on the screen.

6. The mobile electronic device according to claim 1, wherein the controller is configured to display a different item of information according to a position of the mobile electronic device as an item based on information in accordance with a determined movement state of the mobile electronic device even when the movement state of the mobile electronic device is determined to be the same, and display a different item of information according to the movement state of the mobile electronic device as the item based on information in accordance with the determined movement state of the mobile electronic device even when the position of the mobile electronic device is determined to be the same.

* * * * *